United States Patent
Calverley

(10) Patent No.: US 9,470,207 B2
(45) Date of Patent: Oct. 18, 2016

(54) GYROGLIDER POWER-GENERATION, CONTROL APPARATUS AND METHOD

(71) Applicant: Grant Howard Calverley, Friday Harbor, WA (US)

(72) Inventor: Grant Howard Calverley, Friday Harbor, WA (US)

(*) Notice: Subject to any disclaimer, the term of this patent is extended or adjusted under 35 U.S.C. 154(b) by 122 days.

(21) Appl. No.: 14/548,815

(22) Filed: Nov. 20, 2014

(65) Prior Publication Data

US 2016/0208778 A1  Jul. 21, 2016

Related U.S. Application Data

(60) Division of application No. 12/907,967, filed on Oct. 19, 2010, now Pat. No. 8,894,001, which is a continuation-in-part of application No. 12/792,203, filed on Jun. 2, 2010.

(Continued)

(51) Int. Cl.
*F03D 5/00* (2006.01)
*B64C 39/02* (2006.01)
*B64C 27/02* (2006.01)

(Continued)

(52) U.S. Cl.
CPC ............... *F03D 5/00* (2013.01); *B64C 27/02* (2013.01); *B64C 39/022* (2013.01); *F03D 7/00* (2013.01); *F03D 11/04* (2013.01)

(58) Field of Classification Search
CPC ............ F03D 5/00; F03D 7/00; F03D 9/002; F03D 11/04; B64C 27/02; B64C 39/022
See application file for complete search history.

(56) References Cited

U.S. PATENT DOCUMENTS 3,987,987 A * 10/1976 Payne ................. B64C 39/022
                                                244/153 R
5,301,900 A    4/1994 Groen
6,254,034 B1 * 7/2001 Carpenter ............. A63H 27/08
                                                244/153 R (Continued)

FOREIGN PATENT DOCUMENTS

RU         68145 U1     11/2007
WO    2007141795 A1     12/2007

(Continued)

OTHER PUBLICATIONS

Amelin K.S. et al. Adaptativnoe upravlenie avtonomnoy gruppoy bespilotnykh 1-14letatelnykh apparatov. Naychny zhurnal "Stokhasticheskaya optimizatsiya vinformatike" ISSN 2226-3772 (online), ISSN 1992-2922 (Print), Tom 5, 2009,[retrieved on Oct. 7, 2013] Retrieved from the Internet:<URL:http://www.math.spbu.ru/user/gran/optstoch.htm>.

(Continued)

*Primary Examiner* — Valentina Xavier

(57) ABSTRACT

A power generation apparatus and method comprises at least one gyroglider rotary wing flying at an altitude above the nap of the earth. A strong and flexible tether, connected to the gyroglider frame is pulled with a force generated by the rotary wing. The force is transmitted to a ground station that converts the comparatively linear motion of the tether being pulled upward with a lifting force. The linear motion is transferred to a rotary motion at the ground station to rotate an electrical generator. The tether is retrieved and re-coiled about a drum by controlling the gyroglider to fly down at a speed and lift force that permit recovery of the gyroglider at a substantially reduced amount of retrieval force compared to the lifting force during payout of the tether. Thus, the net difference in force results in a net gain of energy.

2 Claims, 27 Drawing Sheets

Related U.S. Application Data

(60) Provisional application No. 61/183,901, filed on Jun. 3, 2009, provisional application No. 61/253,925, filed on Oct. 22, 2009, provisional application No. 61/404,149, filed on Sep. 27, 2010.

(51) Int. Cl.
*F03D 11/04* (2006.01)
*F03D 7/00* (2006.01)

(56) References Cited

U.S. PATENT DOCUMENTS

| | | |
|---|---|---|
| 7,109,598 B2 | 9/2006 | Roberts |
| 7,275,719 B2* | 10/2007 | Olson ............... F03D 5/04 244/153 R |
| 7,656,053 B2 | 2/2010 | Griffith |
| 8,922,046 B2 | 12/2014 | VanderLind |
| 2005/0046197 A1* | 3/2005 | Kingsley ............. F03D 5/00 290/55 |
| 2007/0176432 A1* | 8/2007 | Rolt ................ B64C 39/022 290/55 |
| 2008/0210826 A1 | 9/2008 | Ockels |
| 2010/0230546 A1* | 9/2010 | Bevirt .............. F03D 5/00 244/175 |
| 2011/0025061 A1 | 2/2011 | Roberts |
| 2011/0266809 A1 | 11/2011 | Calverley |
| 2013/0140827 A1* | 6/2013 | Carroll ............. B64C 39/022 290/55 |
| 2013/0154275 A1 | 6/2013 | Calverley |
| 2015/0039161 A1 | 2/2015 | Hastings |
| 2016/0032895 A1* | 2/2016 | Weddendorf ........ F03D 5/00 244/17.23 |

FOREIGN PATENT DOCUMENTS

| | | |
|---|---|---|
| WO | 2009126988 A1 | 10/2009 |
| WO | 2011087541 A2 | 7/2011 |

OTHER PUBLICATIONS

Zhdanov A.A. Adapininye mashiny—neizbezhnoe napravlenie razvitiya tekhniki. 1-14Zadachi i problemy. XII Vserossiyskaya nauchno-tekhnicheskaya konferentsiya"Neiroinformatika—2010": Lektsiya po neiroinformatike.—M.: NIYAU MIFI, 2010,pp. 162-211.

* cited by examiner

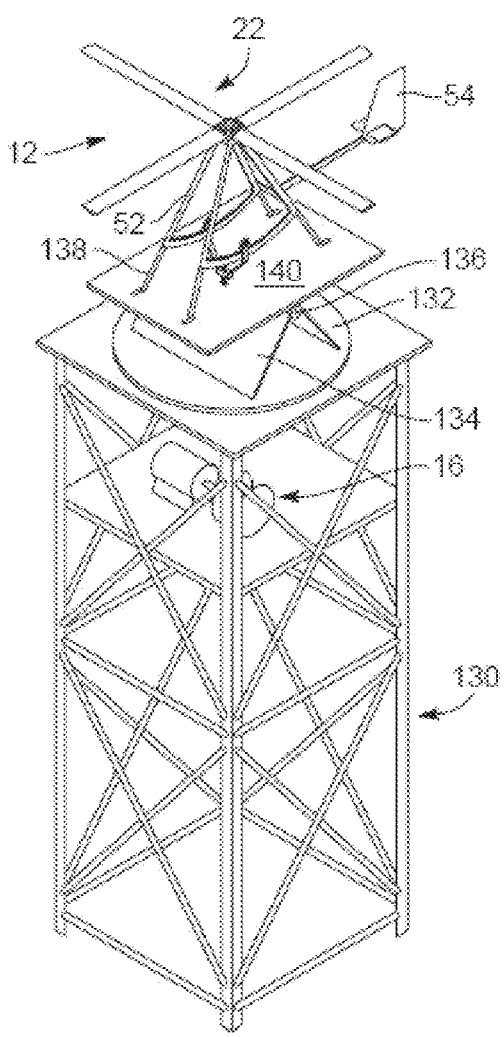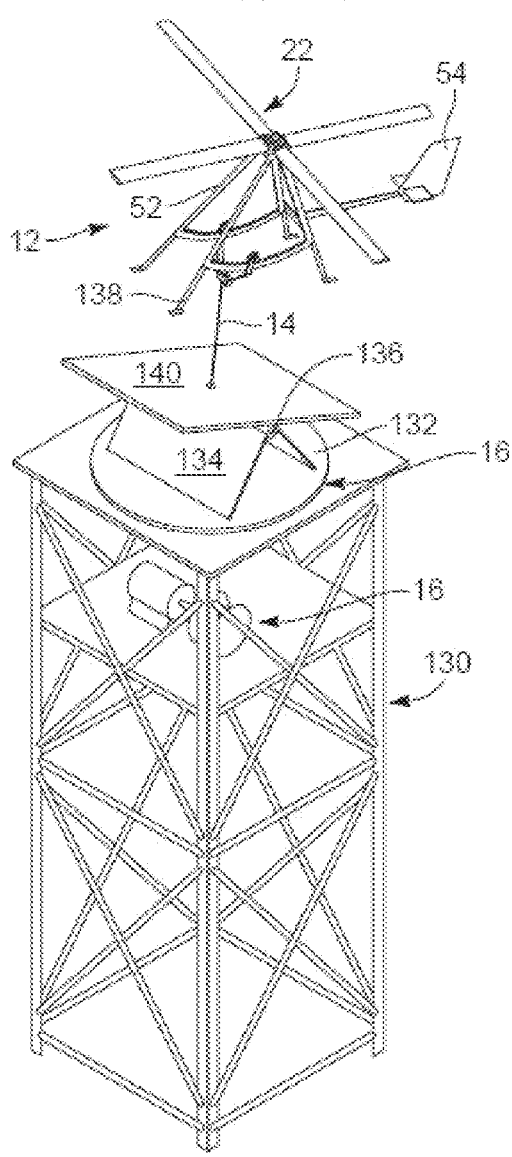

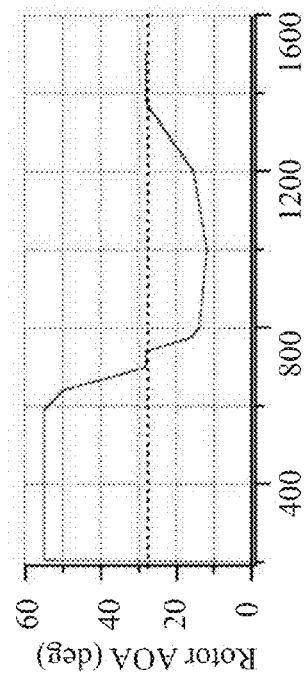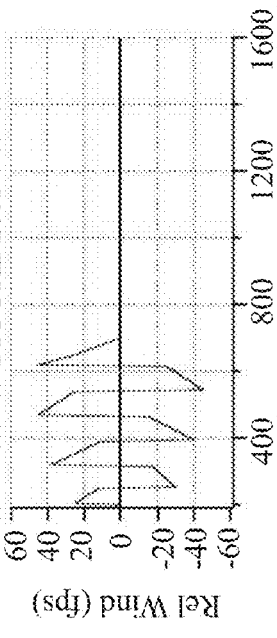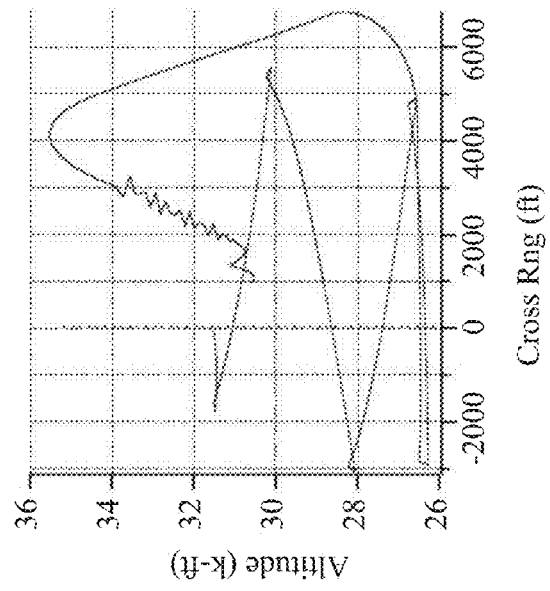
FIGURE 27A
FIGURE 27B
FIGURE 27C
FIGURE 27D
FIGURE 27E

GYROGLIDER POWER-GENERATION, CONTROL APPARATUS AND METHOD

FIELD OF THE INVENTION

This invention relates to field of control of unpowered aircrafts.

In particular, this invention relates to control of tethered grogliders as a mechanism to generate power.

BACKGROUND

Autogyro aircraft are a form of powered or unpowered rotorcraft, typically having one or more auto-rotating airfoils or blades. Gyrodynes power the rotor in preparation for takeoff, and then fly with a freewheeling rotor (rotary wing) in flight, pushed by a pusher propeller. Helicopters power the rotary wing with an onboard engine. Various versions of these have been developed since the first quarter of the twentieth century. During the 1930's autogyro aircrafts were actually employed commercially as rotary wing aircraft for shuttling mail.

An autogyro develops lift from unpowered, freely rotating, rotary blades. The blade of an autogyro is a wing. The wing rotates or "windmills" in response to wind passing through the blade or wing from the underside thereof. As wind passes through the underside of the blade, the angle of the blades with respect to the wind results in the blades responding as sails, transferring momentum from the wind into the blade, turning the blade, and diverting the wind. As the wind is diverted, momentum corresponding to the change in direction and speed of the wind is transferred as momentum into the movement of the blade or wing.

The key principle of an autogyro is the knowledge that the windmilling process of rotating the rotary wing or blades of an autogyro is sufficient to develop speed sufficient to invoke Bernoulli's principle. If the blade is made as more than a windmill, the blade may have a comparatively flatter undersurface and a rounded airfoil shape on its upper surface. Accordingly, as the blade moves through the air, under the motivation of the wind passing through the blade from underneath the blade, the airfoil develops a reduced pressure along the upper surface thereof, developing lift to raise the blade.

A fixed wing aircraft is drawn through the air by a propeller, thus passing air over the fixed wing. Lift occurs by the drop in pressure that occurs as the wind flowing over the top of the wing accelerates to pass over the thickest portion of the wing. A rotary wing also develops lift by the relative motion of air or wind over the top thereof.

The drop in pressure results from the principles of conservation of energy as the air moves relative to the airfoil. Its total pressure head remains substantially constant. If the velocity changes, as it must in order to speed up to pass through a reduced cross sectional area of flow, then the static pressure must drop in order to maintain head at a substantially constant value.

The curvature of the upper surface of an airfoil restricts the available cross sectional area for the air movement to pass through, requiring the air to speed up, thus reducing its pressure to meet conservation of energy requirements.

Autogyro aircraft have been motivated by pusher propellers mounted near the rear of a fuselage, pushing the aircraft forward. The rotor disk, that is, the theoretical disk is swept by the rotary wing, is pitched at an angle that passes the incoming air up through the rotor disk. The rotor disk is tilted upward towards its front extremity, and comparatively downward at its rear most extremity. Meanwhile, the actual angle of the blade itself with respect to the air through which the blade passes in its rotary motion, is set at some angle that will tend to minimize drag, while maximizing lift. "Blade pitch" is generally controlled or set at a position to "fly" through the air.

The most significant discovery about autogyro aircraft is probably the fact that the relative airspeed of a blade or wing rotating in air may be uncoupled from the relative air speed of the overall system (fuselage, axis of rotation, or the like). Thus stall speed may be substantially different from relative ground speed.

Helicopters can actually hover. Autogyros, on the other hand, can only hover in certain limited circumstances wherein their forward motivation from a motor or other mechanism is matched by an actual head wind speed relative to the earth that is naturally occurring. In this circumstance or while descending, an autogyro may hover or maintain position with respect to the earth. Nevertheless, a helicopter may hover in substantially any relative wind, including a still air situation.

Wind energy has been developed along a path substantially independent from aircrafts for many years. Momentum from the passing wind is received, the wind is redirected and that momentum is harvested into motion of the windmill.

By appropriate mechanical linkages, a windmill may pass energy as a linear translation or as a rotary motion to some other operational mechanism. For example, a gristmill transfers the energy of the wind, vanes or blades of the mill to the rotatory motion of a grinding stone.

In the early twentieth century, generators, operating largely as windmills were installed at remote locations inaccessible by public utilities. Such system relied on a windmill-like blade or multiple blades turning a generator, storing energy in batteries.

In more recent years, towers have been erected in various configurations supporting blades that reflect all the aerodynamic engineering of aircraft wings and aircraft propellers acting to retrieve energy from the wind, rather than drawing an aircraft or pushing an aircraft through the air. Thus, large systems have been developed at substantial cost to elevate wind turbine blades, propellers, or the like above the surface of the earth in areas of high wind, constant wind, or otherwise commercially feasible locations of wind energy available for harvest.

Nevertheless, wind energy has been difficult and expensive to develop. Wind on the surface of the earth is predictable primarily as weather patterns, or as daily, directional breeze. At a particular location the daily cycle of wind velocity and direction as a function of time may be plotted. Substantial effort, energy, and engineering resources have been devoted to development of meteorological towers and instrumentation developed to test wind velocity and direction, near the surface of the earth. Wind is created by, and therefore dependent on, terrestrial phenomena. For example, canyons are a classic source of wind energy. The diurnal cycles of heating and cooling along canyons, mountains, and the like give rise to wind velocities and directions that may be harvested for wind energy.

Nevertheless, the physical structures available, and the methods of installing them, are limited by the physics and engineering available to exploit them. There is thus felt a need to develop a method and apparatus to capture wind energy using a greater duty cycle than is typically available for terrestrial windmill locations and effectively use it for generating power.

SUMMARY OF THE INVENTION

In accordance with the present invention, there is provided a gyroglider apparatus for power generation comprising:
  at least one gyroglider comprising a rotor with a plurality of rotor blades rotatably secured to a frame, the rotor adapted to rotate about an axis of rotation and provide a lift to the gyroglider; the rotor having a rotor pitch defined by a path of the rotor with respect to the incoming wind and a blade pitch defined respectively for each of the rotor blades by the angle of the blade with respect to the incoming wind;
  a tether having a first end and a second end, the first end being positioned proximate the earth and the second end extending aloft, the tether being adapted to secure the gyroglider at the second end thereof;
  tension management means adapted to manage tension in the tether comprising:
    an onboard tension meter adapted to measure tension existing in or added to the tether;
    a wind speed sensor adapted to indicate the wind speed to which the gyroglider is exposed; and
    a controller adapted to receive inputs from the onboard tension meter and the wind speed sensor and cyclically monitor the tension in the tether, the controller being further adapted to determine whether the input from the onboard tension meter is consistent with the configuration of the gyroglider, the rotor and the blades; and generate an output state of the tether;
  a first control means adapted to receive the output state of the tether and selectively control the rotor pitch if the output state indicates a value too low or too high with reference to a predetermined range;
  a second control means adapted to receive the output state of the tether and selectively control the blade pitch if the output state indicates a value too low or too high with reference to the predetermined range;
  a capstan adapted to receive the output state of the tether and further adapted to cyclically reel in or payout the tether proximate the first end thereof, in a predetermined systematic order if the output state indicates a value way too low or way too high with reference to the predetermined range;
  a converter adapted to convert rotational energy from the capstan to power in a form selected from the group consisting of transmissible forms, storage forms and both, a transmissible form and a storage form; and
  a connector adapted to connect the capstan to the converter.

Preferably, in accordance with this invention, the gyroglider is spaced apart from other the gyroglider in a series on the tether in the event there are more than one gyrogliders.

Typically, the tether is selected from the group of materials consisting of steel cable, synthetic polymeric fiber braided into ropes, ultra-high strength, ultra-high thermal and flame resistant fiber and carbon nanotube ropes.

Typically, the capstan is selected from the group consisting of reel, spool and sheave.

Preferably, the capstan is secured proximate a surface of the earth selected from land and water.

Preferably, the converter is selected from the group consisting of electrical generator, hydraulic motor, motor-generator and gas compressor.

Typically, the frame is provided with pitch control means selected from the group consisting of rudders, elevators and both a rudder and an elevator.

Typically, in accordance with this invention, the first control means and the second control means are coupled.

In accordance with an aspect of the invention, the first control means includes the frame comprising the track defining a path for a pinion operated by a servo, the pinion operated along the track adapted to control the rotor pitch.

In accordance with another embodiment of the present invention, there is provided a gyroglider apparatus for power generation comprising:
  at least one gyroglider comprising a rotor secured to a mast, the rotor being provided with a plurality of rotor blades rotatably secured to a frame and adapted to rotate about an axis of rotation and provide a lift to the gyroglider; the rotor having a rotor pitch defined by a path of the rotor with respect to the incoming wind and a blade pitch defined respectively for each of the rotor blades by the angle of the blade with respect to the incoming wind;
  a tether having a first end and a second end, the first end being positioned proximate the earth and the second end extending aloft, the tether being adapted to secure the gyrogliders at the second end thereof;
  tension management means adapted to manage tension in the tether comprising:
    an onboard tension meter adapted to measure tension existing in or added to the tether;
    a wind speed sensor adapted to indicate the wind speed to which the gyroglider is exposed; and
    a controller adapted to receive inputs from the onboard tension meter and the wind speed sensor and cyclically monitor the tension in the tether, the controller being further adapted to determine whether the input from the onboard tension meter is consistent with the configuration of the gyroglider, the rotor and the blades; and generate an output state of the tether;
  a first control means adapted to receive the output state of the tether and selectively control the rotor pitch if the output state indicates a value too low or too high with reference to a predetermined range;
  a second control means adapted to receive the output state of the tether and selectively control the blade pitch if the output state indicates a value too low or too high with reference to the predetermined range;
  a capstan adapted to receive the output state of the tether and further adapted to cyclically reel in or payout the tether proximate the first end thereof, in a predetermined systematic order if the output state indicates a value way too low or way too high with reference to the predetermined range;
  a converter adapted to convert rotational energy from the capstan to power in a form selected from the group consisting of a transmissible form, a storage form and both, a transmissible form and a storage form; and
  a connector adapted to connect the capstan to the converter.

Preferably, in accordance with this invention, the first control means comprises:
  at least two pitch controllers adapted to operate along rails provided on the frame, the frame being adapted to maintain a spread angle between a front and rear portion to establish a predetermined length for the rails, the rails defining a path for a pinion, the pinion operating along the rails adapted to move the pitch controllers back and forth along the rails, the rails being further adapted to be selected from the group consisting of smooth rails, toothed rails, smooth rails with a detent adapted to provide a preferential position to the frame when restrained by the tether, a forward portion ahead of the detent and an aft portion rearward of the detent and toothed rails adapted to provide a preferential position to the frame when restrained by the tether, a forward portion ahead of the detent and an aft portion rearward of the detent; and a roll controller adapted to operate on a track extending between the pitch controllers, the frame being further adapted to maintain an angle between a left and right portion to establish a predetermined length for the track.

Additionally, in accordance with this invention, the frame is provided with a mount structure adapted to provide a platform for mounting control and communication equipment.

Typically, in accordance with this invention, bearings are provided to reduce friction between the rotor and the mast, the bearing being provided with bearing rollers operating between an inner race adapted to be substantially fixed with respect to the rotation or lack thereof of the mast and a rotating outer race, the bearing rollers being selected from the group consisting of thrust bearing rollers and ball bearings. Alternatively, the bearing rollers may operate between a rotating inner race and an outer race adapted to be substantially fixed with respect to the rotation or lack thereof of the mast.

Preferably, in accordance with this invention, the gyroglider apparatus further comprises:

the frame adapted to be in the form of a tube;

the rotor further comprising pivots provided between a hub and the blades, the pivots being adapted to extend along a path that is canted with respect to a radius extending from the center of the hub; and the first control means comprising an actuator operatively connected between the frame and a boom fixed to the inner race of the bearing, the actuator being provided with a movable element and a housing substantially fixed with respect to the frame, the actuator being adapted to rotate a boom by extending the movable element to control the rotor pitch.

In accordance with one more aspect of this invention, the first control means comprises a pivotable platform adapted to pitch about a predetermined pivot on the frame, the platform having a front end and a back end spaced apart from each other at a predetermined distance, the front end being in a region proximal to the pivot and the back end adapted to extend away from the pivot and being provided with a bias element operatively connected to the frame, the bias element being adapted to urge the platform into a particular attitude with respect to the frame.

In accordance with an aspect of this invention, the second control means includes the rotor further comprising pivots provided between a hub and the blades, the pivots being adapted to extend along a path that is canted with respect to a radius extending from the center of the hub and facilitate flapping of the blades to control the blade pitch.

Preferably, in accordance with this invention, the apparatus further includes bearings provided to reduce friction between the rotor and the mast, the bearings adapted to have bearing rollers operating between a rotating inner race and an outer race adapted to be substantially fixed with respect to the rotation or lack thereof of the mast; a power generator in the form of a coil fixed with respect to the inner race and the outer race, the coil being adapted pass through a magnetic field created by a magnet attached to the inner race, the power generator adapted to provide operational power to instrumentation and control equipment associated with the gyroglider.

Preferably, in accordance with this invention, jets are placed at the extreme outer ends of the blades, the jets being activated by remote control from a ground station and adapted to control flight during start up and fly down of the gyroglider.

Typically, in accordance with another aspect of this invention, the second control means includes the rotor further comprising pivots provided between a hub and the blades, the pivots being adapted to extend along a path that is perpendicular with respect to a radius extending from the center of the hub and facilitate flapping of the blades to control the blade pitch, the blades being adapted to be canted at an angle forward in a leading edge direction.

In accordance with yet another aspect of this invention, the first control means includes the rotor further comprising pivots provided between a hub and the blades, the pivots adapted to secure each blade to an anchor provided fixedly to the hub and rotating therewith, a pin adapted to extend through each of the anchors to secure trunnions fixed to each of the blades, the pin being further adapted to extend along a direction perpendicular to a radius through the center of the hub.

Typically, the first control means may also include the rotor further comprising pivots provided between a hub and the blades, the pivots adapted to secure each blade to an anchor provided fixedly to the hub and rotating therewith, a pin adapted to extend through each of the anchors to secure trunnions fixed to each of the blades, the pin being further adapted to be canted at an angle with respect to a radius through the center of the hub.

Additionally, in accordance with this invention, the second control means further comprises:

the rotor further comprising pivots provided between a hub and the blades; and a biasing element operatively connected between the hub and the blades by an attachment means selected from the group consisting of bollards, posts and boles, the biasing element adapted to bias each of the blades in an upward position, the biasing element being a resilient element adapted to be controlled by a centrifugal force and further adapted to passively control the blade pitch.

Particularly, the second control means further comprises:

the rotor further comprising pivots provided between a hub and the blades; and a biasing element operatively connected between the hub and the blades by an attachment means selected from the group consisting of bollards, posts and boles, the biasing element adapted to bias each of the blades in an upward position, the biasing element being a servo actuator adapted to actively control the blade pitch.

Preferably, in accordance with this invention, the gyroglider is provided with legs, the legs being adapted to be attached to the frame in a manner selected from the group of attachment means consisting of extensible, permanent, and retractable, the gyroglider being adapted to take off or land on a deck supported by the legs, the deck adapted to pitch about a pivot abutting the deck at a predetermined angle for adequate rotor pitch, the deck being supported on a turntable atop a structure selected from the group consisting of buildings, towers, barges, buoys and watercrafts.

Preferably, in accordance with this invention, the apparatus further comprises:
  a landing fixture with a captive slot;
  two support arms with a proximal end and a distal end, the support arms adapted to pivotably secure the landing fixture at the distal end;
  a hollow turntable adapted to pivotably secure the support arms at the proximal end;
  a first and second bridle line adapted to be cradled in the captive slot and further adapted to roll and pitch for the pitch control, the first and second bridle lines converging at a bridle knot to form the tether; and
  a snatch block being firmly anchored to a structure selected from the group consisting of buildings, towers, barges, buoys and watercrafts, the snatch block being located just below the turntable at the center, the first end of the tether being connected to the snatch block.

Additionally, in accordance with this invention, the apparatus further comprises:
  a staging mechanism adapted to selectively remove each of the frames from the associated rotor at a ground station, the staging mechanism being further adapted to stack the rotors in close proximity to each other separated by a padding for storage and still further adapted to redeploy each frame with its associated rotor; and
  a capture mechanism adapted to secure the frame to a hub of the rotor, the capture mechanism being further adapted to selectively fix the frame at a predetermined location on the tether.

Furthermore, in accordance with this invention, the first control means includes:
  a controller adapted to draw a pitch arm of the gyroglider downwards or release it upwards to control pitch of the gyroglider, the controller being further adapted to extend or shorten the distance from the controller of a roll arm provided one on either side of the gyroglider to control roll of the gyroglider; and
  a bridle comprising:
    a first pitch control line and a second pitch control line being connected to the pitch arm at a forward end and an aft portion of the frame respectively and further connected to the controller; and
    a first roll control line and a second roll control line being connected to each of the roll arms and further connected to the controller.

Preferably, the first control means includes:
  at least one roll control means selected from the group consisting of toothed track, hydraulic ram, line and smart metal mounted to an underside of said frame with at least one servo roller;
  a bridle comprising a first control line and a second control line, said first and second control lines having a proximal end and a distal end, said proximal end of said first control line and said second control line being connected to an aft end and a fore end of said frame respectively, said proximal end of said first control line being further adapted to be connected to said aft end via said servo roller, said proximal end of said second control line being further adapted to be connected to said fore end via another of said servo roller in the event there are two of said roll control means; and
  a controller connected to the distal end of the first and second control line and adapted to pull in or out the first control line and the second control line to activate pitch control, the controller being further adapted to co-operate with the servo roller to pull or release the first and second control line by moving to a left or right direction with reference to the frame to activate roll control.

Typically, in accordance with this invention, the controller is selected from the group consisting of computerized control mechanism and autopilot.

Particularly, in accordance with one aspect of this invention, the apparatus further comprising:
  a toothed track mounted to an underside of the frame with a servo roller; and
  a weighted box containing battery and other heavy flight equipment, the box being adapted to slide fore and aft on the track to change the center of gravity (CoG) for a controlled free flight.

Optionally, in accordance with this invention, the apparatus further comprising a horizontal stabilizer connected at the rear end of the gyroglider, the stabilizer having control surfaces to provide a counter downward force to match the lifting force of the Center Of Pressure (CoP) at the rotor, for a controlled free flight.

A system for meteorological data collection, radar systems, fire detection, ground sensing, communication devices and telephone cell repeaters using a gyroglider apparatus may be made in accordance with the present invention.

Preferably, in accordance with this invention, there is provided a tether storage system comprising:
  a cylindrical tank with an open top surface and closed cylindrical wall, the tank being adapted to have a diameter slightly larger than the natural coiling diameter of the tether, the cylindrical wall being coated with a layer adapted to reduce friction and heat buildup;
  a center pillar with a cylindrical wall, the pillar being adapted to serve as a space filler and located coaxially in the tank defining a storage space for the tether in between the pillar and the tank, the storage space being just adequate to lay down the tether in a predetermined orderly manner and prevent the tether from doubling back or figure eighting as it is laid down into the tank in the manner, the cylindrical wall being coated with the layer; and
  a power roller, pulley and guide arrangement adapted to lay the tether through the center of the open top surface into the tank at a predetermined speed in one direction only.

Preferably, in accordance with this invention, the layer is a Teflon coating.

Typically, in accordance with this invention, the power roller is adapted to spin either clockwise or counter clockwise to lay the tether into the tank.

Preferably, in accordance with this invention, the power roller is adapted to be raised or lowered into the tank and further adapted to raise or lower the center pillar to minimize the distance of fall of the tether from the roller to the tank.

Preferably, in accordance with this invention, the tether is stored in a tether storage system as described herein above.

A wheeled vehicle or a watercraft may be driven by a gyroglider in accordance with the present invention.

Preferably, in accordance with this invention, the capstan is connected to the converter via a clutch and flywheel, the clutch and flywheel are adapted to regulate the RPM and torque at the input to the converter.

Particularly, the controller is adapted to control the gyroglider in response to a navigation system associated with the gyroglider, the navigation system being selected from the group consisting of global positioning system and omni beacon detector, adapted to avoid interference with the navigation system associated with the other gyroglider.

Preferably, in accordance with this invention, the controller is adapted to control the gyroglider in response to a navigation system associated with the gyroglider, the navigation system being selected from the group consisting of global positioning system and omni beacon detector, adapted to avoid interference with the navigation system associated with the other gyroglider.

Preferably, in accordance with this invention, the gyroglider apparatus as described herein above further comprises:
  means to vary bank angle of the rotor defined by the angle between the gyroglider's normal axis and the Earth's vertical plane containing the gyroglider's longitudinal axis; and
  means to manage shunting of the gyroglider, the means being adapted to maneuver the gyroglider cross wind such that a cross range velocity is induced and further adapted to induce a relative wind on the rotor in excess of ambient wind resulting in tension in the tether.

In accordance with the present invention, there is envisaged a method of power generation, the method comprising the steps of:
  providing at least one gyroglider comprising a rotor with a plurality of rotor blades rotatably secured to a frame, the rotor having a rotor pitch defined by a path of the rotor with respect to the incoming wind and a blade pitch defined respectively for each of the rotor blades by the angle of the blade with respect to the incoming wind;
  providing a tether wound on a capstan, the tether having a first end and a second end;
  positioning the first end of the tether proximate the earth and the second end extending aloft,
  securing the gyroglider on the tether at the second end thereof;
  connecting the capstan to a converter;
  measuring tension existing in or added to the tether;
  measuring the wind speed to which the gyroglider is exposed;
  cyclically monitoring the tension in the tether to generate an output state of the tension;
  flying the gyroglider against the tension in the tether by:
    selectively controlling the rotor pitch if the output state indicates a value too low or too high with reference to a predetermined range;
    selectively controlling the blade pitch if the output state indicates a value too low or too high with reference to the predetermined range;
    controlling the tension in the tether by cyclically reeling in the tether by operating the converter or paying out the tether by operating the converter in reverse, if the output state indicates a value way too low or way too high with reference to the predetermined range; and
  converting rotational energy from the capstan to power.

Preferably, the step of securing the gyroglider on the tether includes spacing apart the gyroglider from the other the gyroglider in a series on the tether in the event there are more than one gyrogliders.

Preferably, the step of flying the gyroglider against the tension in the tether includes controlling the gyroglider by an autopilot.

Typically, the step of flying the gyroglider against the tension in the tether includes controlling the gyroglider by an autopilot in response to a position thereof detected by a navigation system associated with the gyroglider without interference from the navigation system associated with other the gyroglider in the event there are more than one gyrogliders.

Typically, in accordance with this invention, the step of selectively controlling the rotor pitch is coupled to the step of selectively controlling the blade pitch.

Preferably, in accordance with this invention, the step of selectively controlling the rotor pitch comprises the steps of:
  providing a mast co-linear with an axis of rotation of the rotor; and
  controlling a tilting angle of the mast with respect to the frame.

Preferably, the step of selectively controlling the rotor pitch comprises controlling both roll and pitch of the gyroglider.

Additionally, the step of selectively controlling the rotor pitch comprises controlling pitch of the gyroglider.

Typically, the step of selectively controlling the blade pitch comprises passive controlling by biasing each blade to an upward position by providing biasing elements in the form of resilient elements for effecting pivoting of the blades towards the axis of rotation.

Typically, the step of selectively controlling the blade pitch comprises countering the urging of a biasing element provided for each of the blades by the centrifugal force urging a leveling of the blades in response to an increase in the speed of rotation of the rotor about the axis of rotation. Alternatively, the step of selectively controlling the blade pitch comprises active controlling by biasing each blade to an upward position by providing biasing elements in the form of servo actuators for effecting pivoting of the blades towards the axis of rotation.

Preferably, in accordance with this invention, the step of selectively controlling the blade pitch includes both active and passive control of the blade pitch.

In accordance with this invention, the step of controlling the tension in the tether includes reducing the tension by reducing the blade pitch and increasing the tension by increasing the blade pitch.

Preferably, according to an aspect of the invention, the step of selectively controlling the blade pitch includes reducing and increasing, respectively the rotor pitch.

Preferably, in accordance with this invention, the above described method further comprises:
  pre-rotating the rotor in the incoming wind by setting the blade pitch at a negative value; and
  transferring momentum between the incoming wind and the blades, the rotor operating as at least one of a windmill and a wind turbine.

The method of power generation further comprises active controlling of the gyroglider by selectively pivoting the blades between a turbine position having a negative blade pitch and a gyroglider position having a positive blade pitch.

The method of power generation still further comprises:
  providing a gimbal secured to the rotor to support rotation of the rotor therearound; and
  pivoting the gimbal to pitch with respect to the frame.

Preferably, the step of selectively controlling the rotor pitch comprises providing a gimbal that pitches about a pivot with respect to the frame such that the ratio of lift to drag of the rotor is equal to the ratio of the length to the height of the offset of the center of rotation of the rotor imposed by the distance from the axis of rotation to the pivot, and the height of the center of rotation above the pivot, respectively.

Preferably, the method of power generation further comprises reeling in the gyroglider, by the capstan, in response to a reduction in the speed of the incoming wind below a threshold value. It also includes reeling in the gyroglider at a relative velocity selected to fly the gyroglider substantially to the capstan under a controlled flight.

In accordance with the present invention, the method of power generation also comprises flying the gyroglider substantially to the capstan in response to the speed of the incoming wind dropping beyond a threshold value required for at least one of a controlled flight and power generation.

The method of power generation further comprises managing the tension in the tether by the rotor responding thereto, the rotor blades moving to a position of decreased blade pitch in response to increase in the tension and an increase in blade pitch in response to a decrease in the tension.

In accordance with an aspect of this invention, the step of selectively controlling the blade pitch comprises coupling the blade pitch to a coning angle of the blades in the rotor, the coning angle representing an angle between an axis of the blade and the axis of rotation of the rotor.

In accordance with another aspect of this invention, the step of selectively controlling the blade pitch comprises coupling the blade pitch to a coning angle of the blades in the rotor, the coning angle representing an angle between an axis of the blade and the axis of rotation of the rotor; and effecting a change in the coning angle by changing the balance of forces acting on the blades between the tether and the incoming wind.

In accordance with the present invention, the method of power generation further comprises:
providing legs secured to the frame;
locating a landing surface proximate the capstan, the landing surface defining a surface in space;
extending the tether from the capstan through the surface in space;
drawing the tether, by the capstan, through the surface in space;
contacting the landing surface by at least one of the legs for landing the gyroglider on the landing surface; and
positioning the rotor to rotate in a plane parallel to the landing surface by tilting the frame, by at least one of the legs, in response to the contacting the landing surface.

In accordance with the present invention, the method of power generation further comprises:
positioning instrumentation on the frame; and
maintaining the gyroglider aloft at a substantially fixed altitude as a high-altitude tower.

Preferably, in accordance with this invention, the step of selectively controlling the rotor pitch includes controlling the rotor pitch in response to increasing proximity of the rotor to the ground during landing.

The method of power generation further comprises:
providing a plurality of gyrogliders secured to the tether with a single capstan, all of the gyrogliders operably connected to deliver power;
flying the plurality of gyrogliders aloft;
flying the plurality of gyrogliders down to a landing surface;
retrieving each of the gyrogliders of the plurality of gyrogliders individually and one at a time;
removing each of the gyrogliders from the tether individually and one at a time;
selectively removing each of the frames from the associated rotor;
stacking the rotors in close proximity to each other separated by a padding for storage; and
redeploying each of the plurality of gyrogliders with the frame and its associated rotor.

In accordance with one more aspect of the present invention, the method of power generation further comprises:
providing motive means selected from the group consisting of jets, propellers, and motors, the motive means being secured to the blades;
detecting an emergency situation; and
operating the motive means to maintain a controlled flight of the gyroglider.

The method of power generation further comprises storing the tether comprising the steps of:
providing a cylindrical tank having an open top surface and closed cylindrical wall having a diameter slightly larger than the natural coiling diameter of the tether;
coating a layer on the cylindrical wall to reduce friction and heat buildup;
providing a center pillar coaxial with the tank;
defining a storage space between the tank and the pillar, the storage space being just adequate to lay down the tether in a predetermined orderly manner; and
lowering the tether into a the storage space at a predetermined speed in an orderly manner using a roller, pulley and guide arrangement operating in a manner selected from the group consisting of movable assembly or fixed and spinning assembly.

Preferably, in accordance with this invention, the step of flying the gyroglider against the tension in the tether further comprises:
maintaining the rotor pitch to be constant;
varying bank angle defined by the angle between the gyroglider's normal axis and the Earth's vertical plane containing the gyroglider's longitudinal axis;
cross wind maneuvering of the gyroglider such that a cross range velocity is induced;
inducing a relative wind on the rotor in excess of ambient wind; and
shunting of the gyroglider.

BRIEF DESCRIPTION OF ACCOMPANYING DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 1 is a schematic representation of a gyroglider system 10 in accordance with a first embodiment of the present invention, including one or more gyrogliders, flying against the tension of a tether connected to a capstan, generating power based on the cyclical pulling on the tether from a distance at a tension force and retreating back down against a lower force by flying the gyrogliders in a reduced lift orientation;

Figure 6:
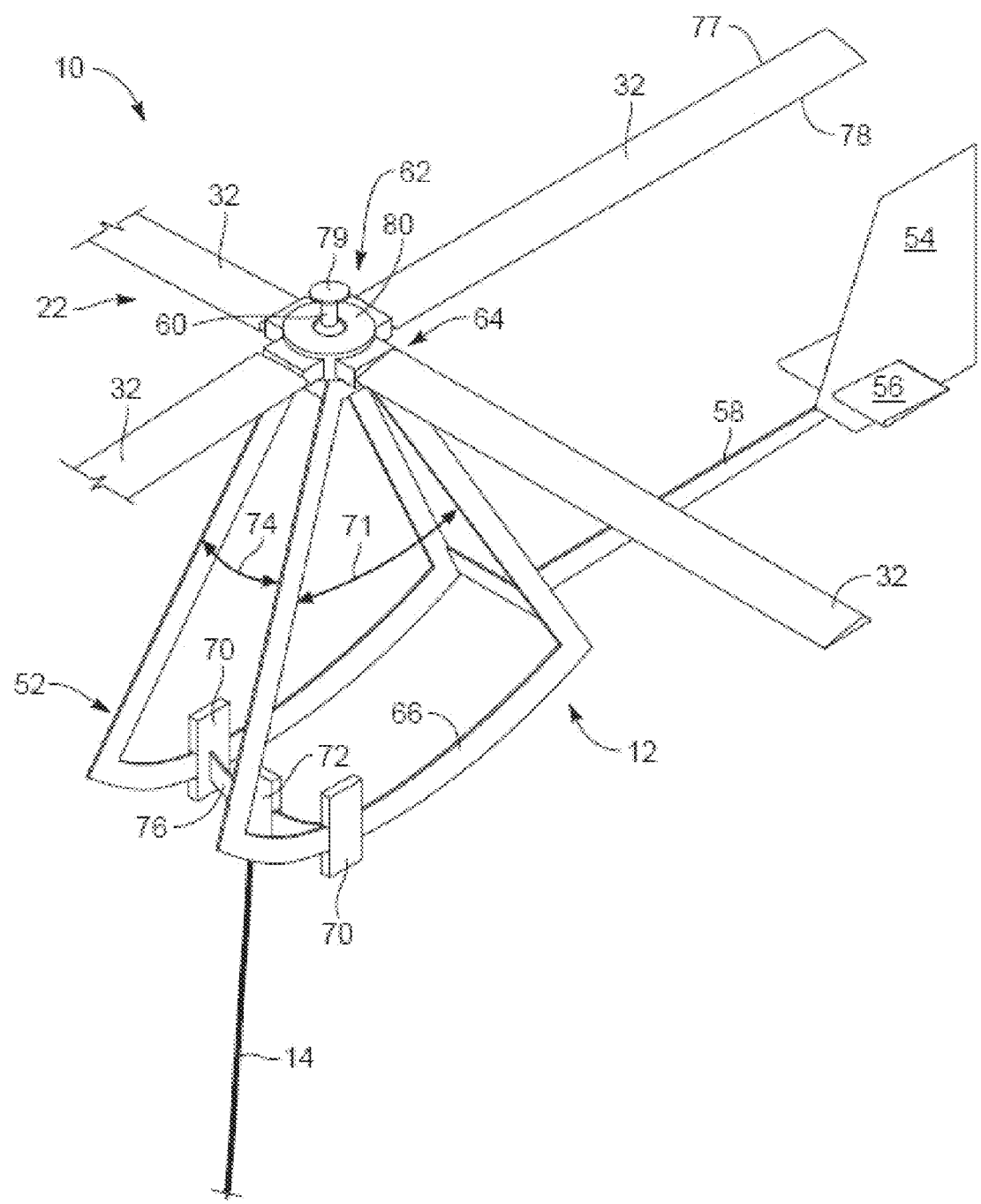
FIG. 6 is a perspective of one embodiment of an apparatus using a minimum fuselage, an open frame, for a gyroglider tethered to the system of FIG. 1, and incorporating both roll and pitch control between the tether and the frame of the gyroglider.
Figure 7:
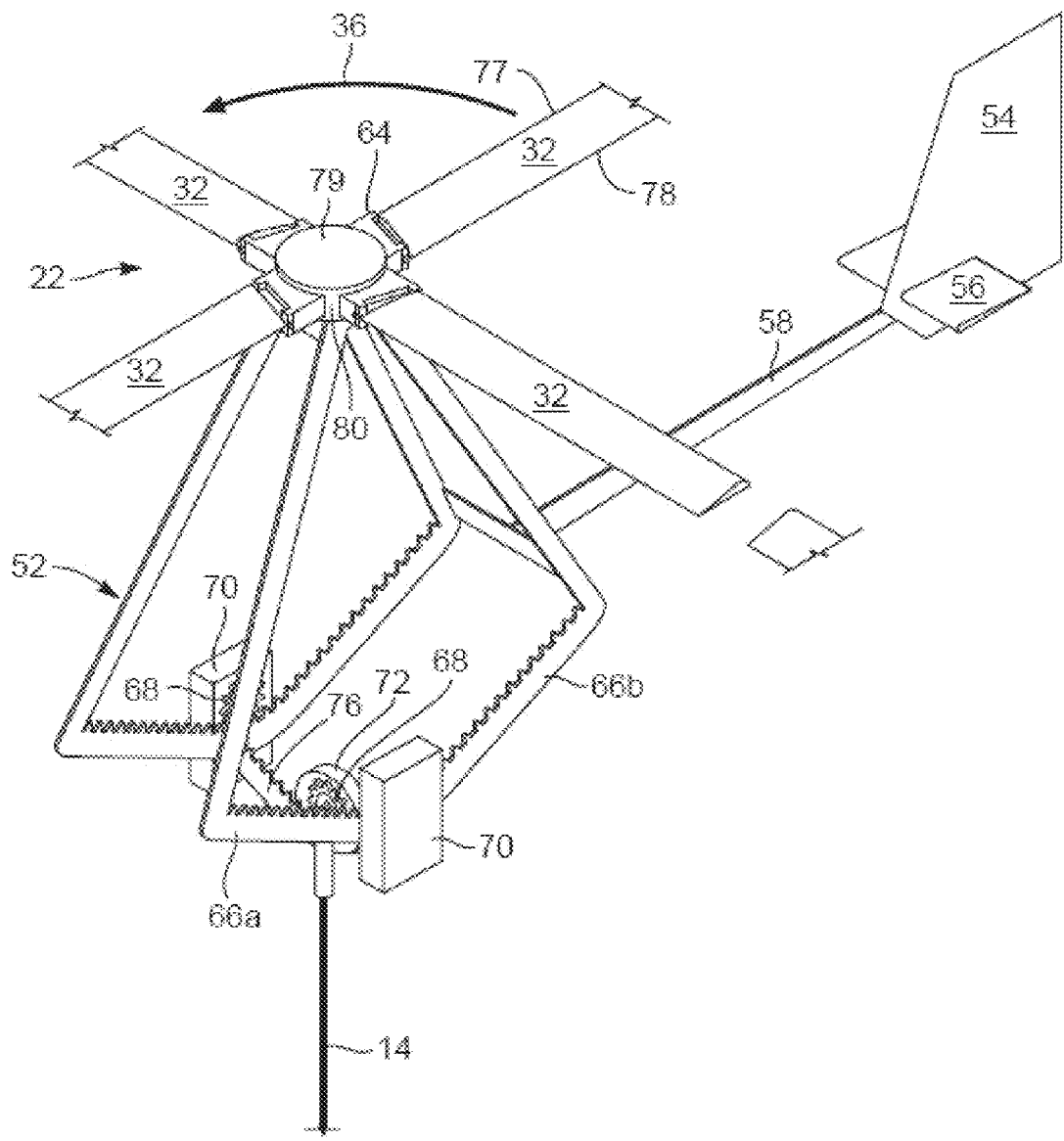
Figure 8:
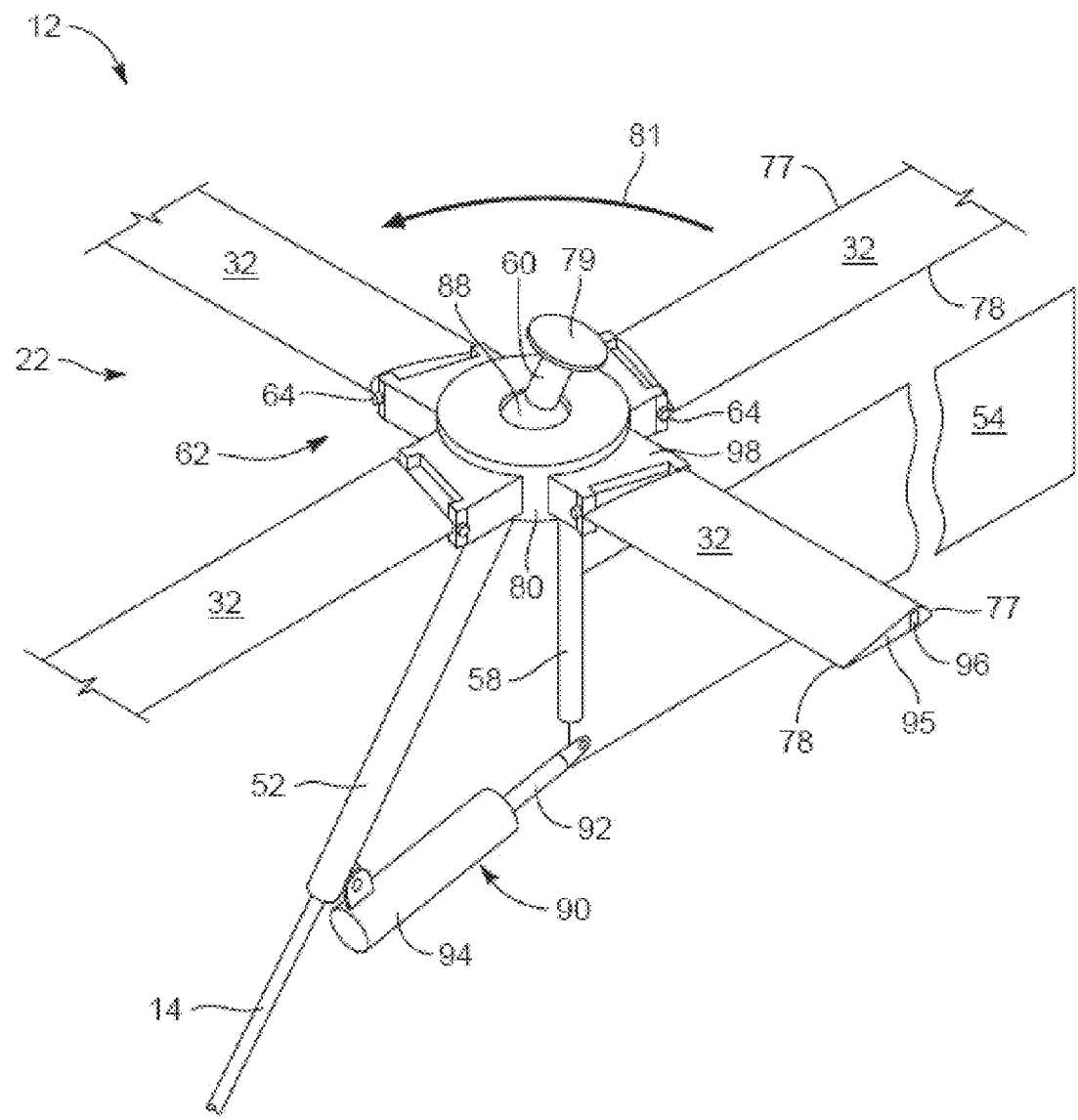
Figure 9:
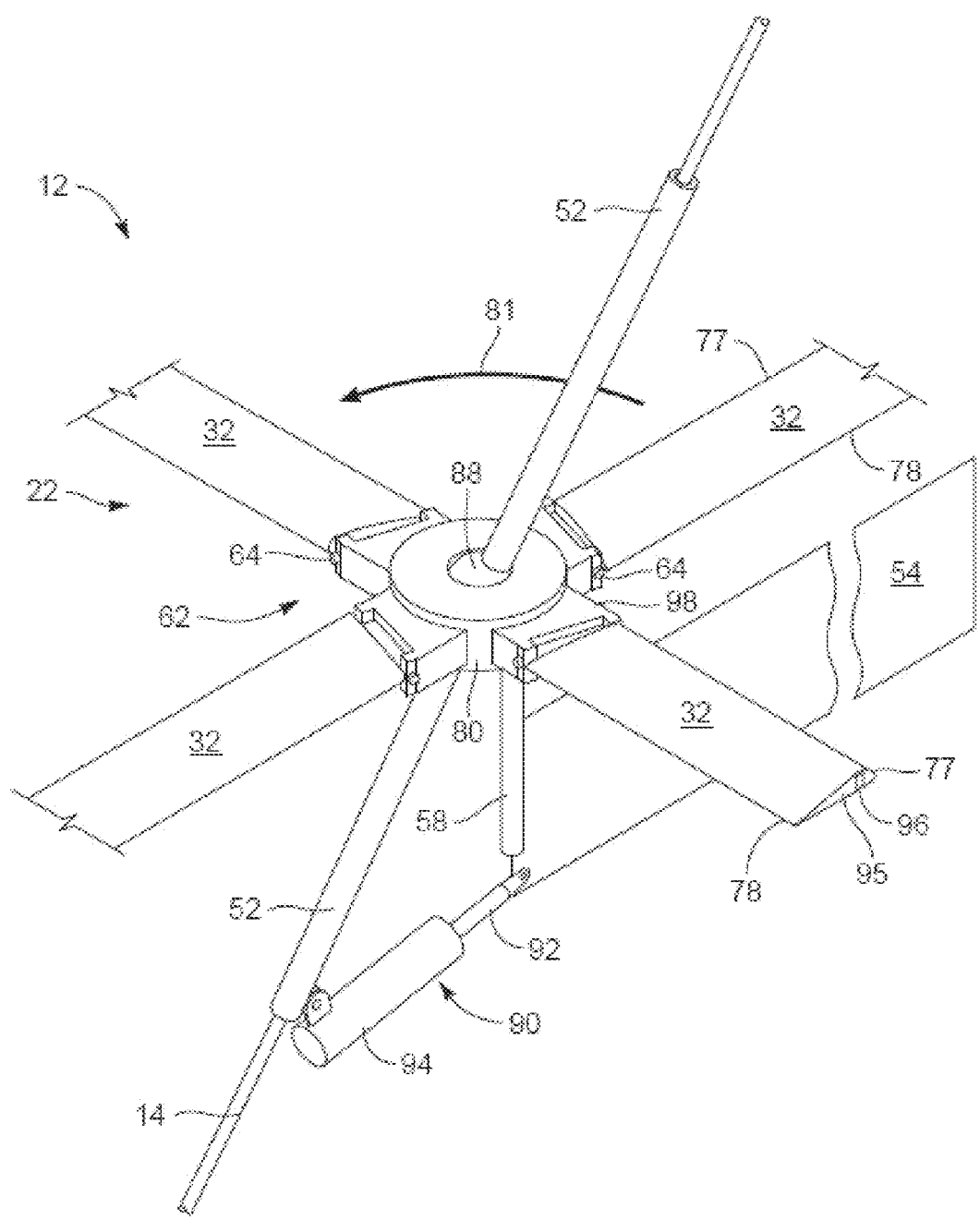
Figure 10:
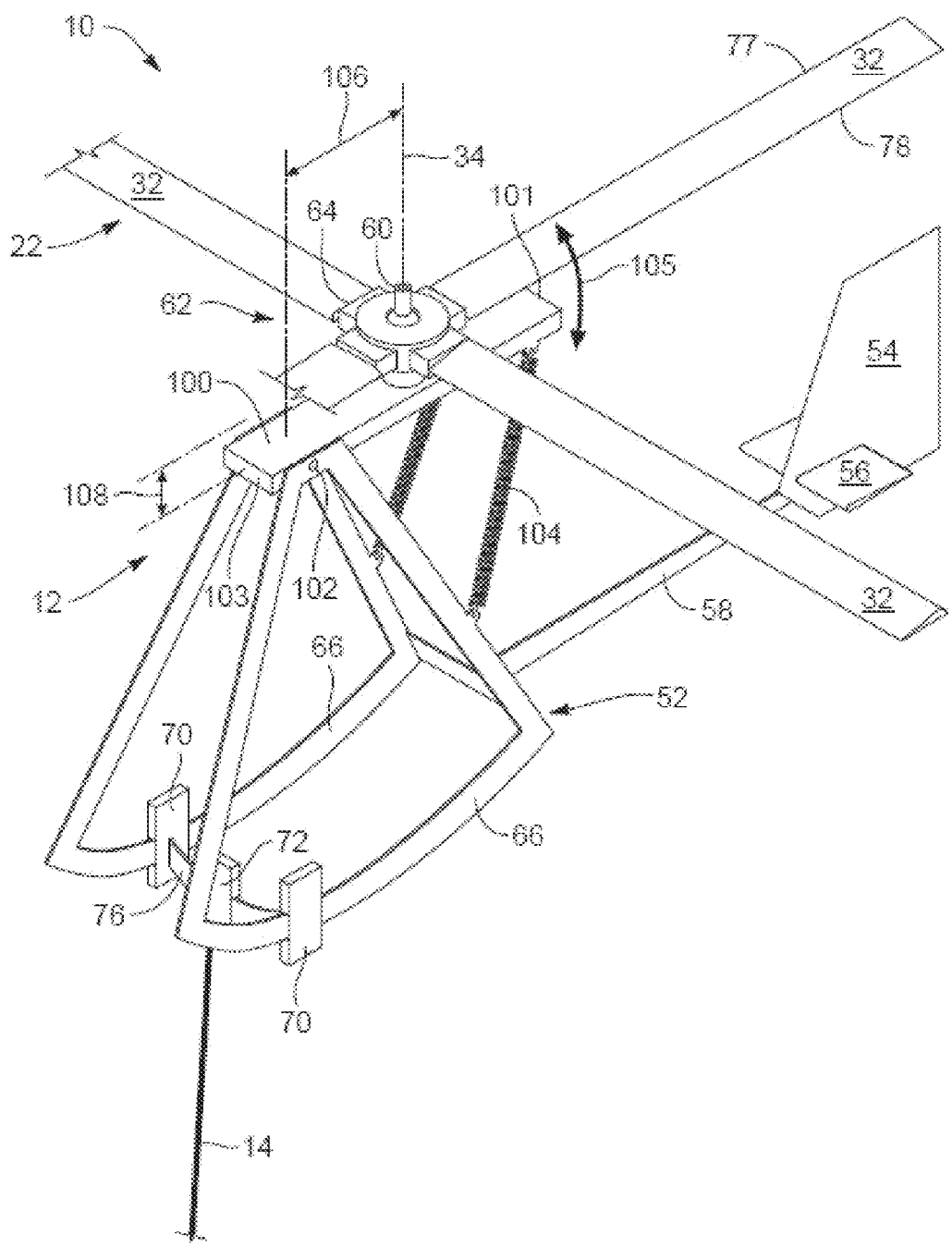
Figure 11:
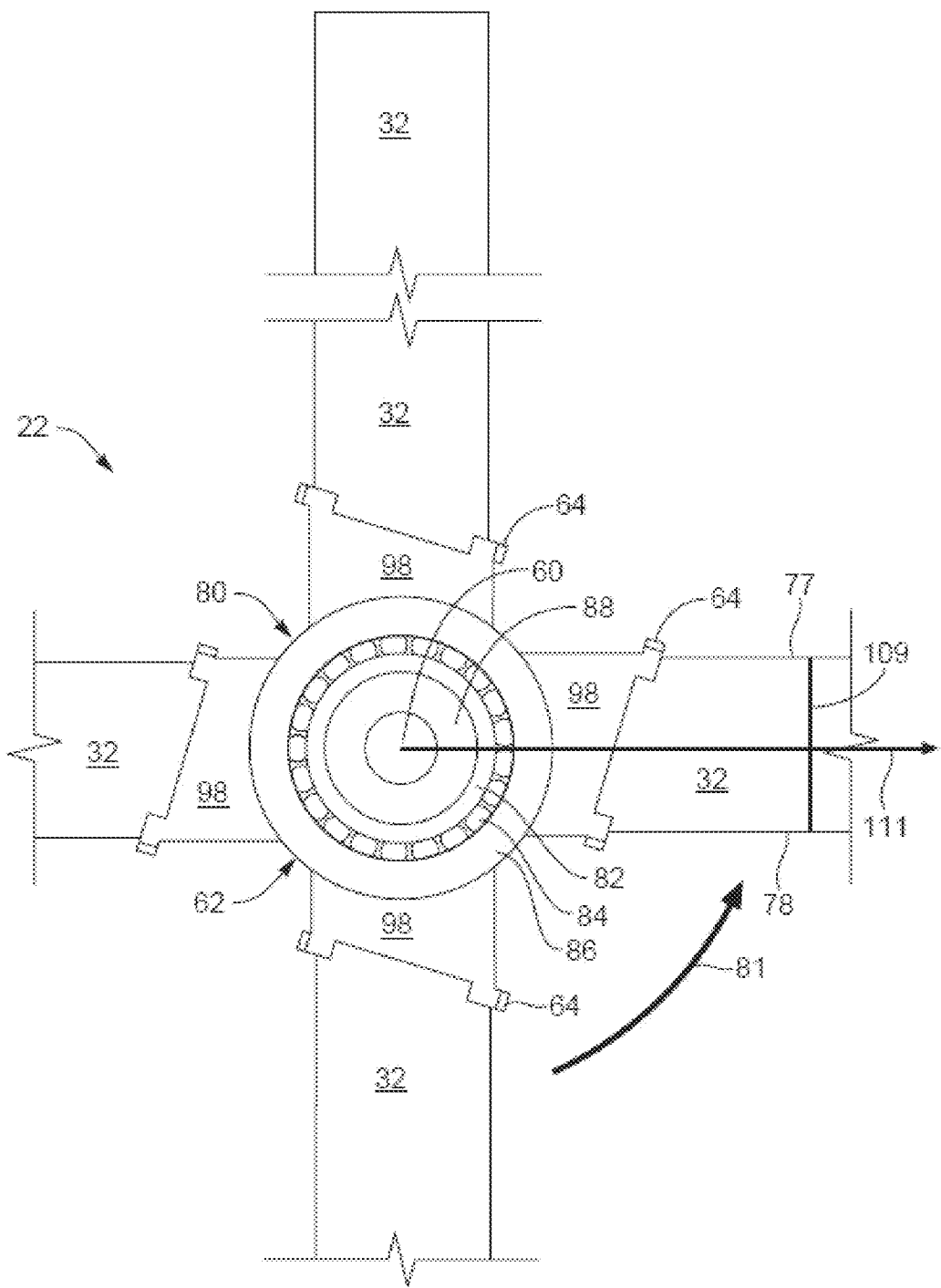
Figure 12:
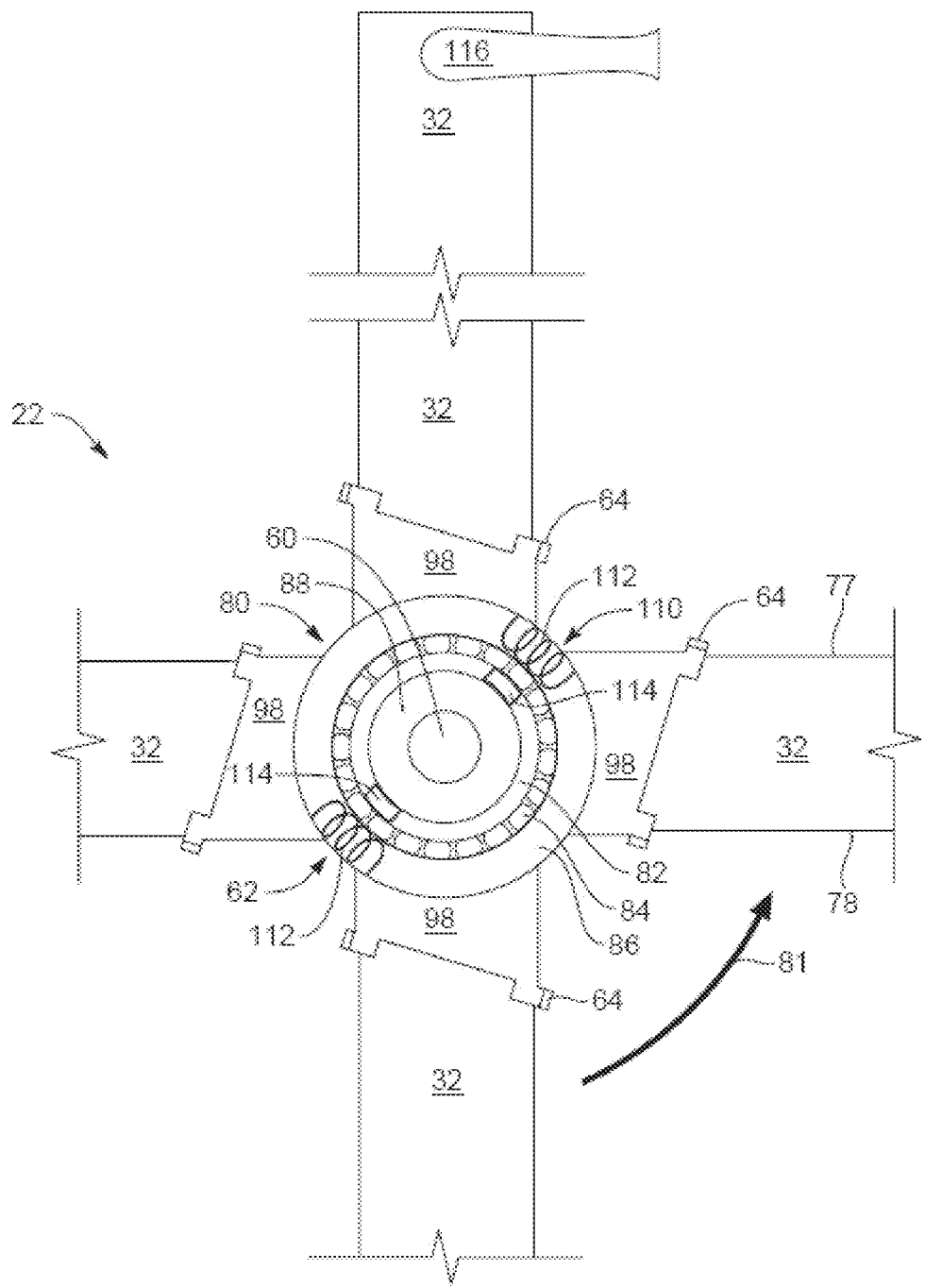
Figure 13:
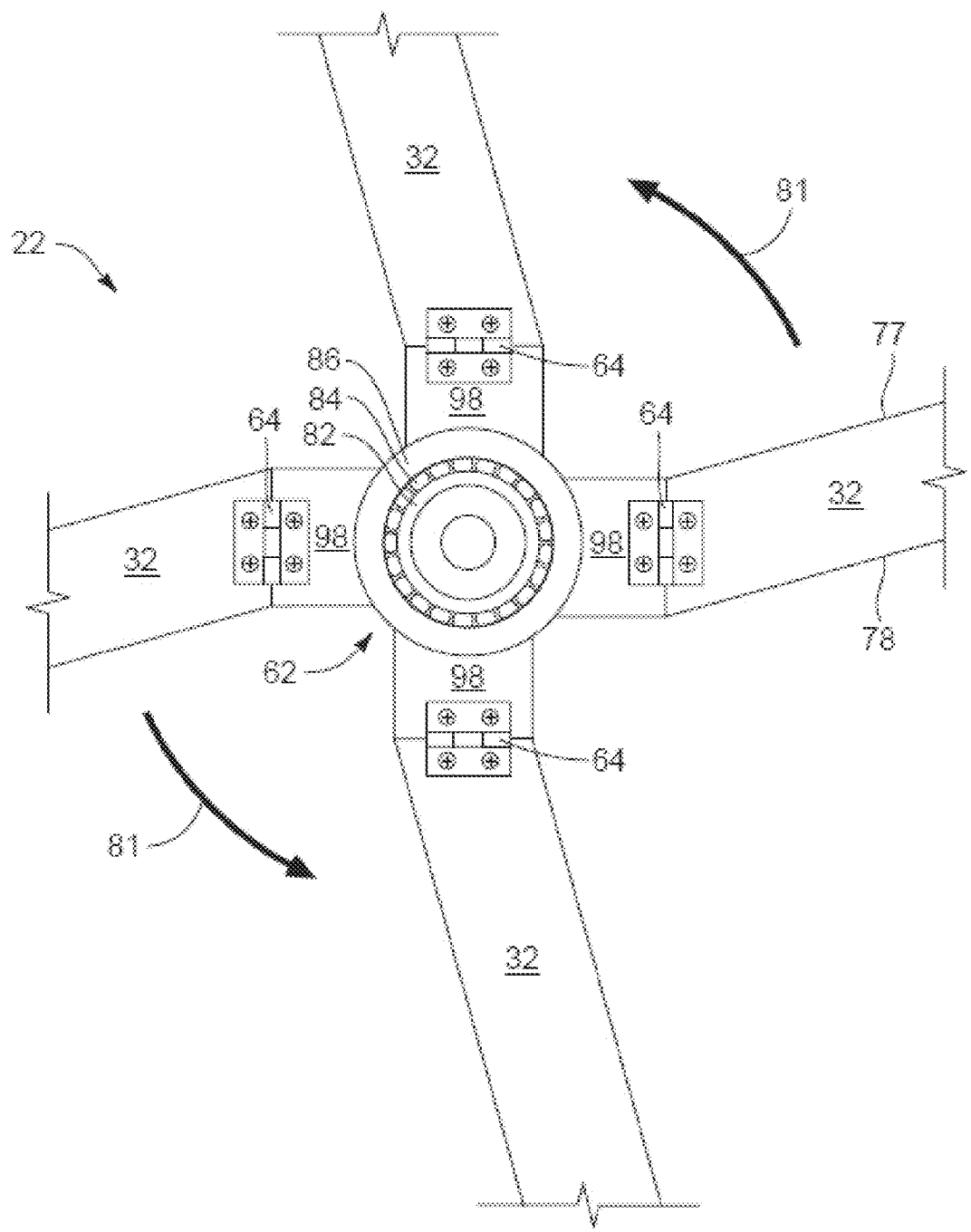
Figure 14:
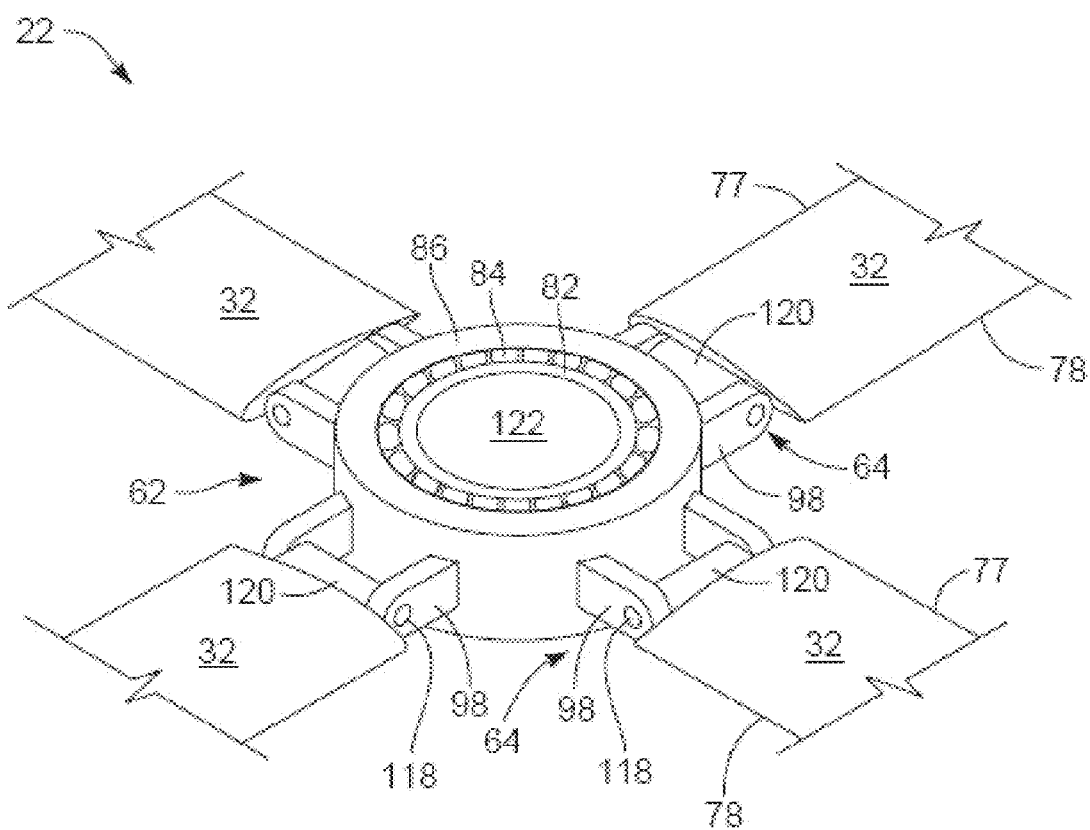
Figure 15A:
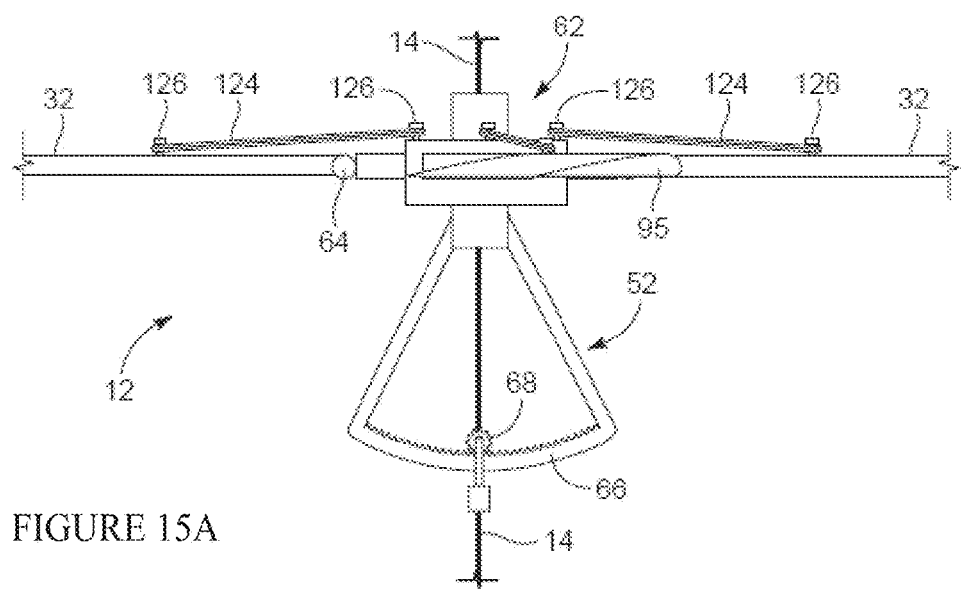
Figure 15B:
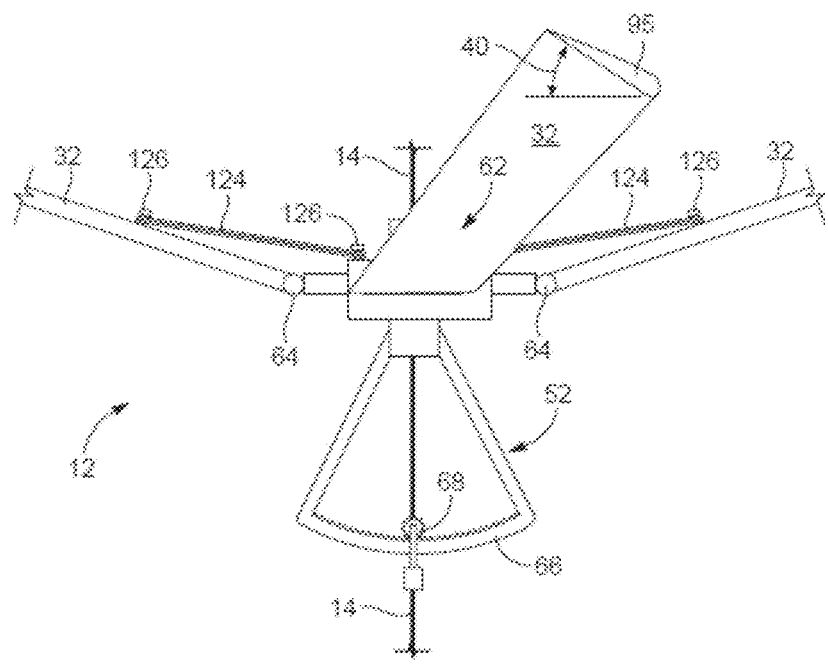
Figure 18:
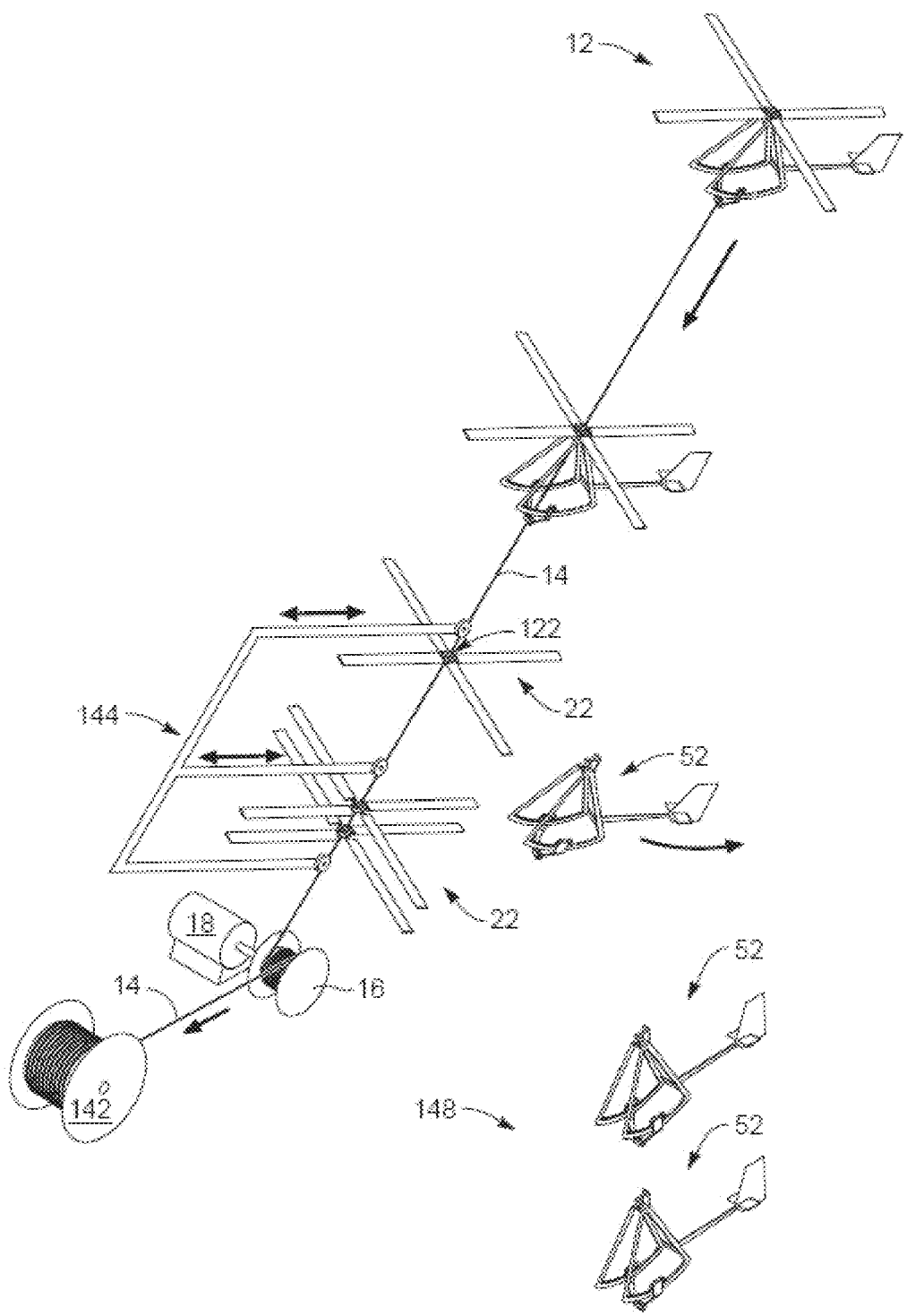
Figure 19:
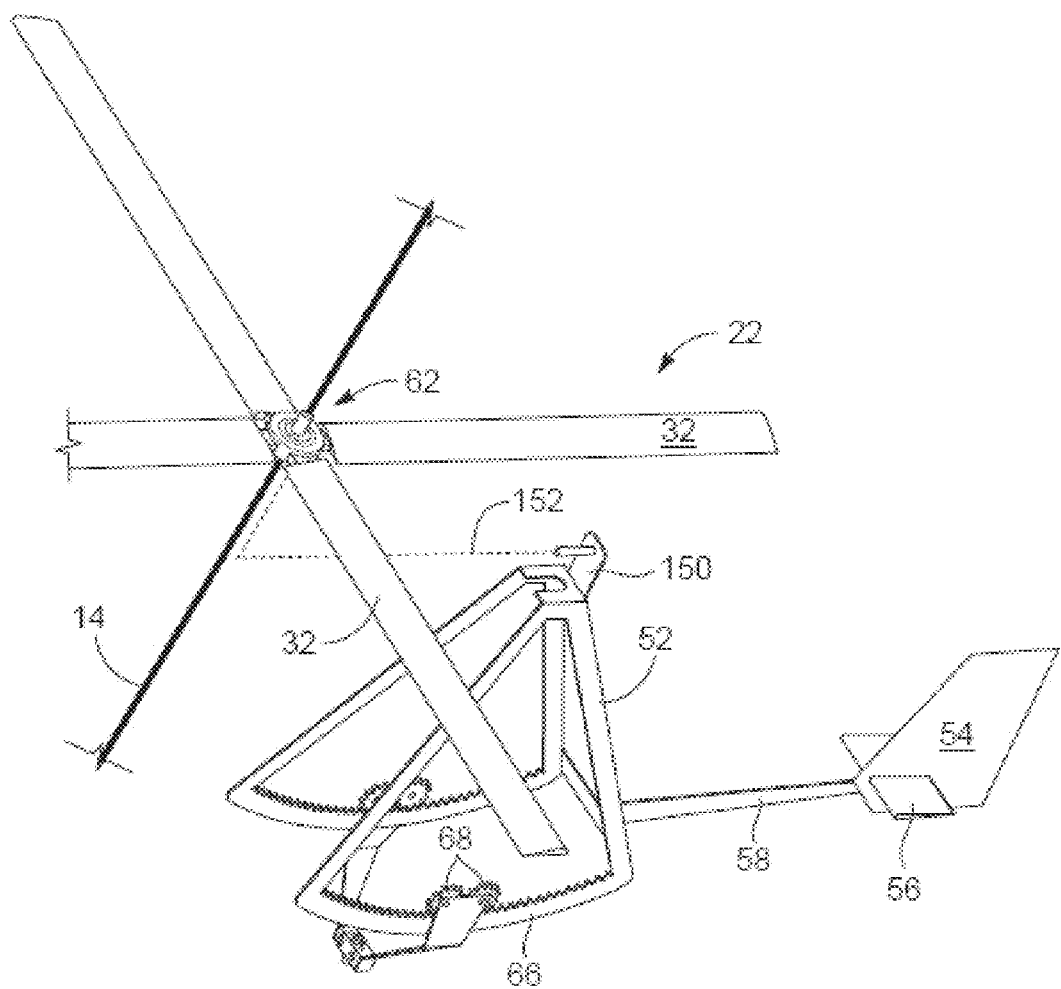
Figure 20:
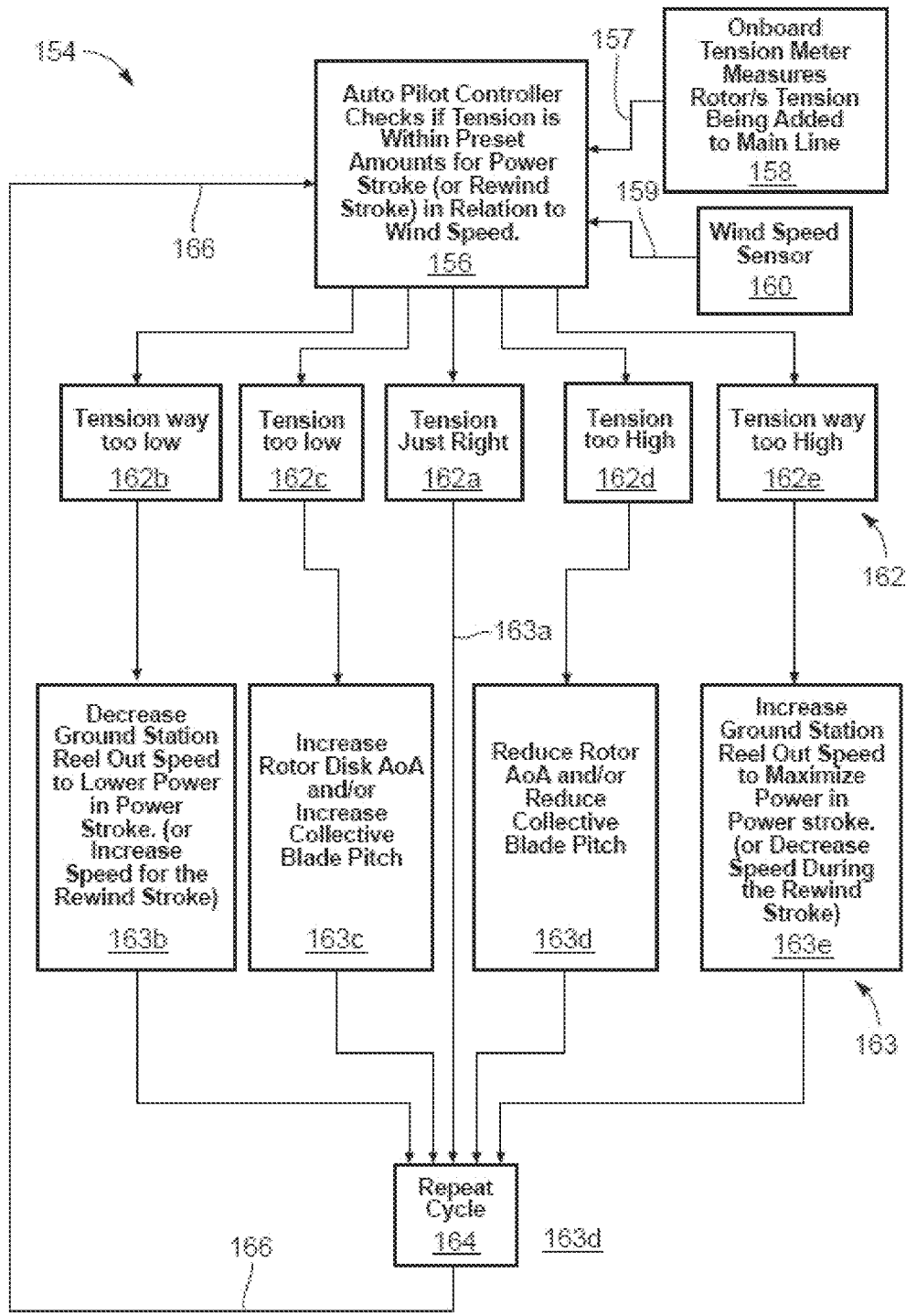
Figure 21A:
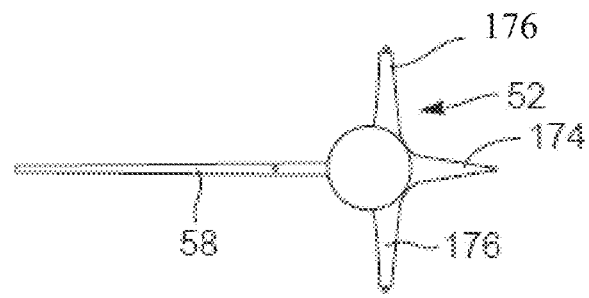
Figure 21B:
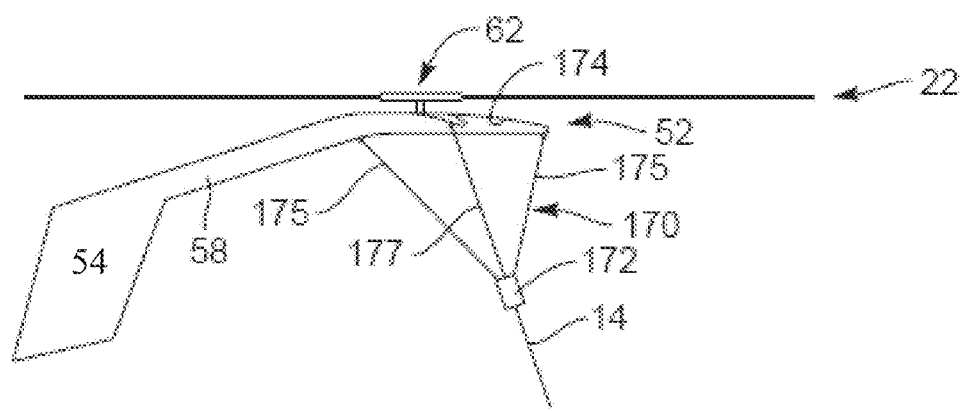
Figure 21C:
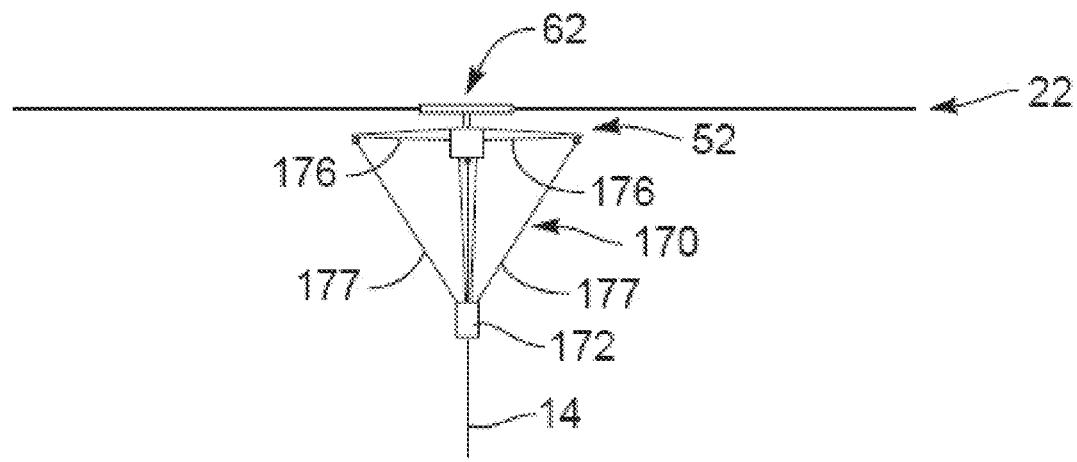
Figure 21D:
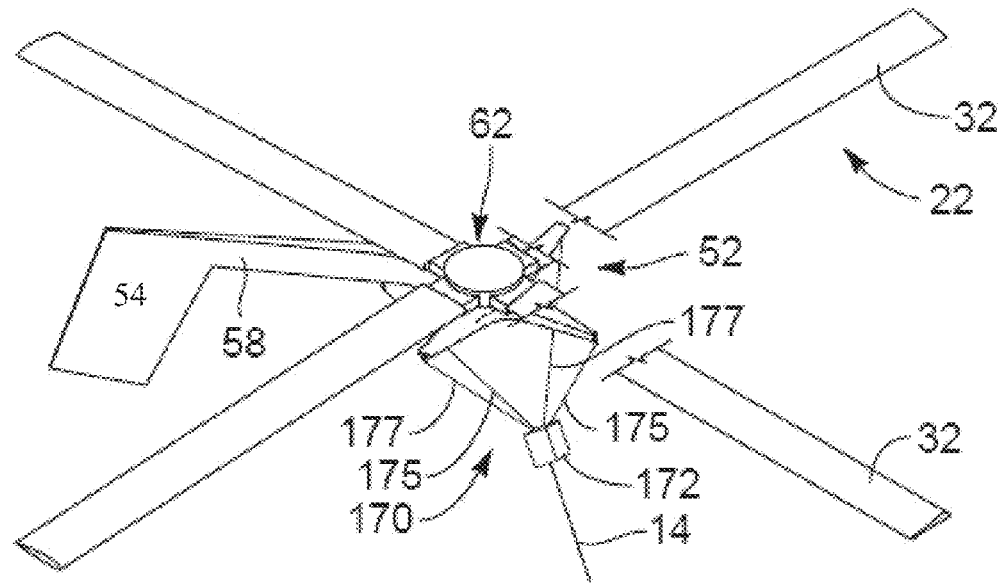
Figures 22A, 22B:
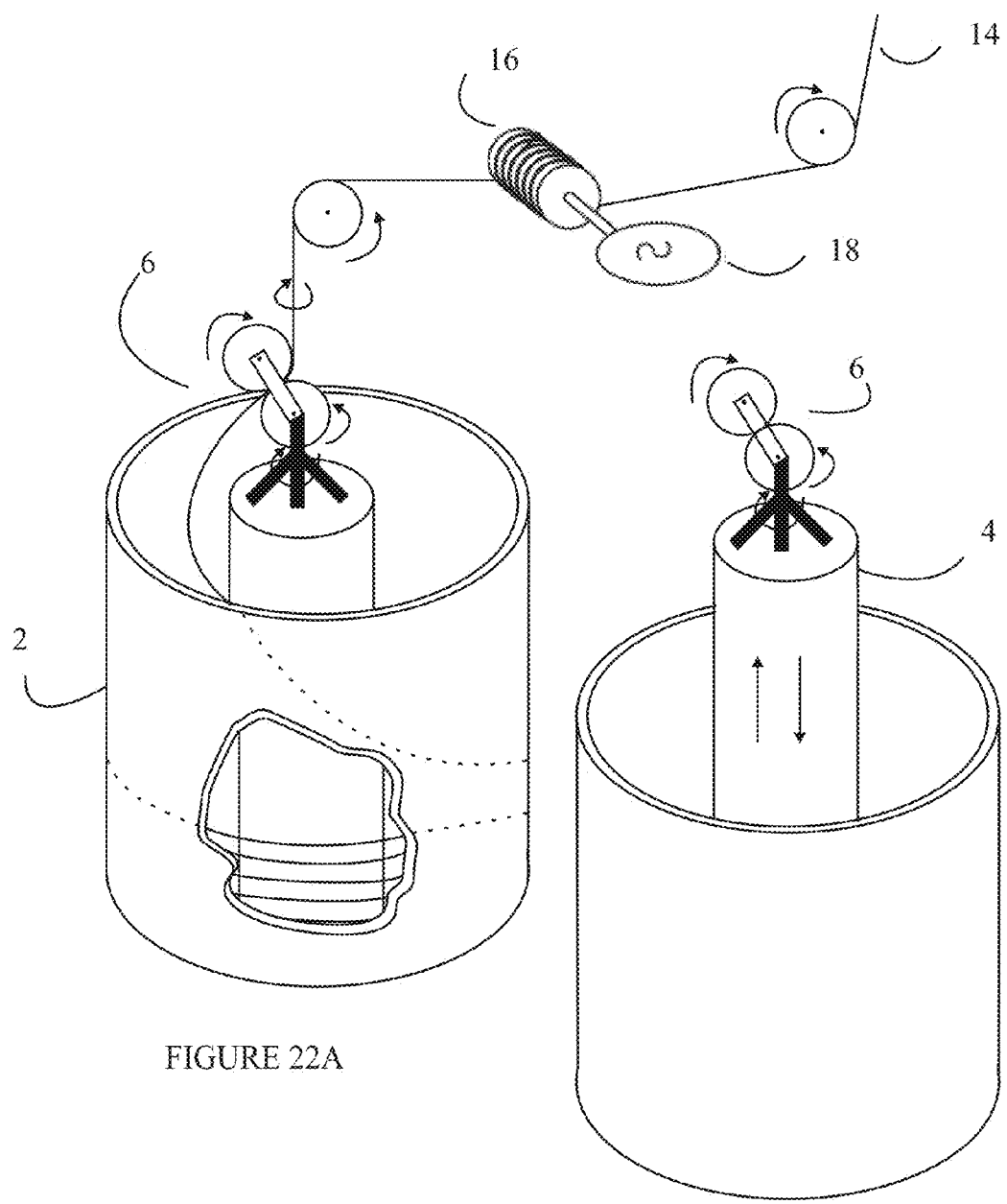
Figure 23:
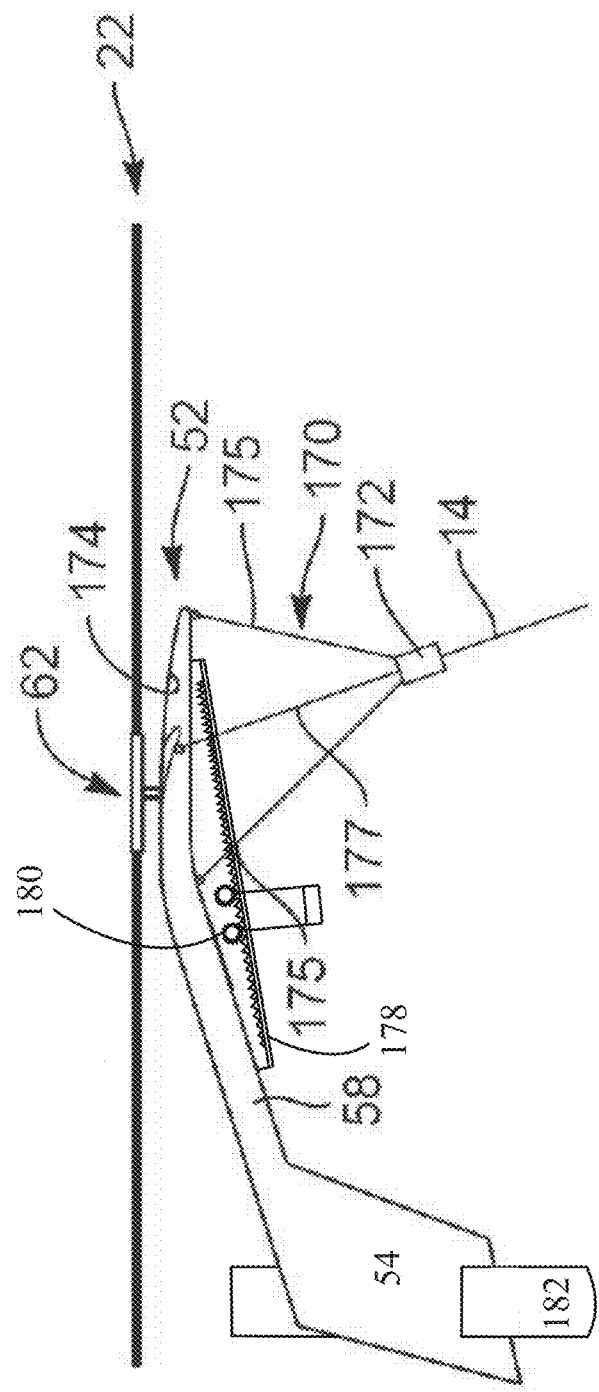
Figure 24:
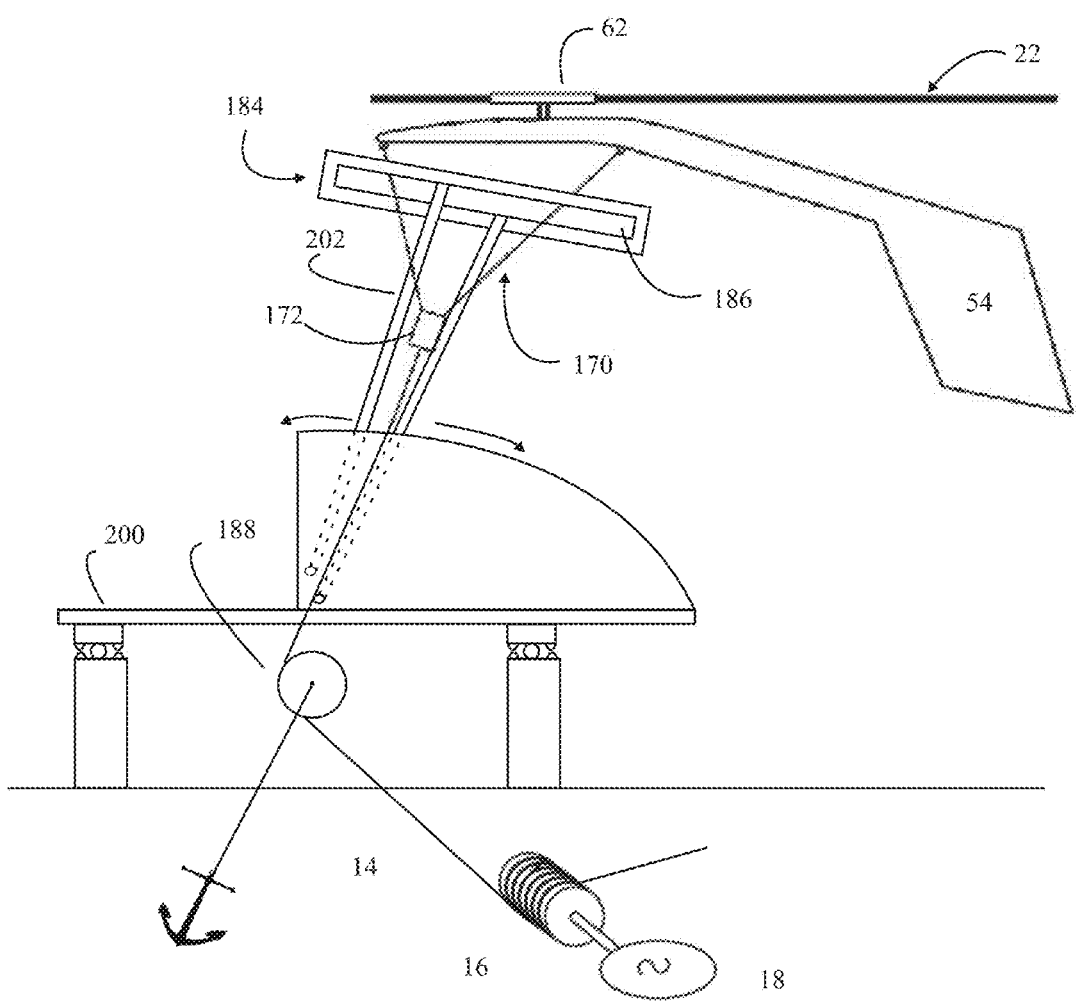
Figure 25:
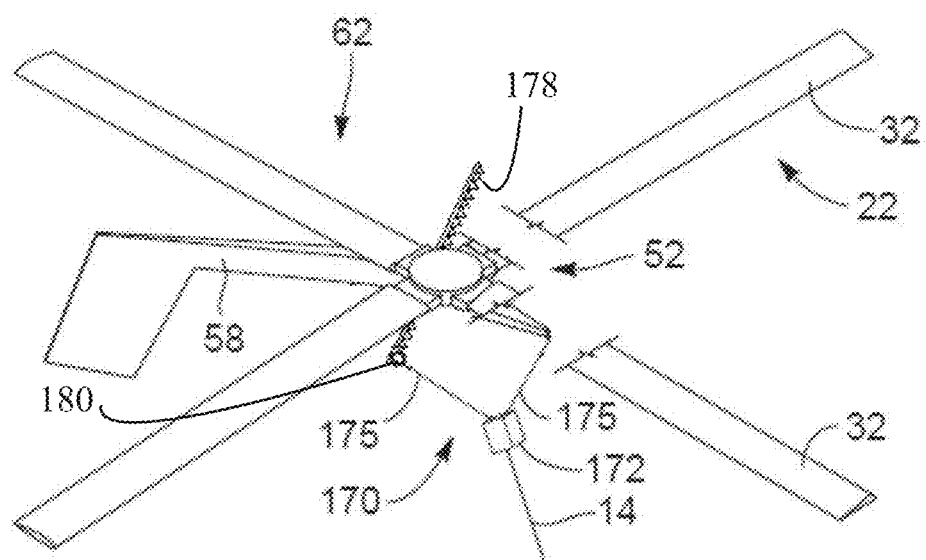
Figure 26:
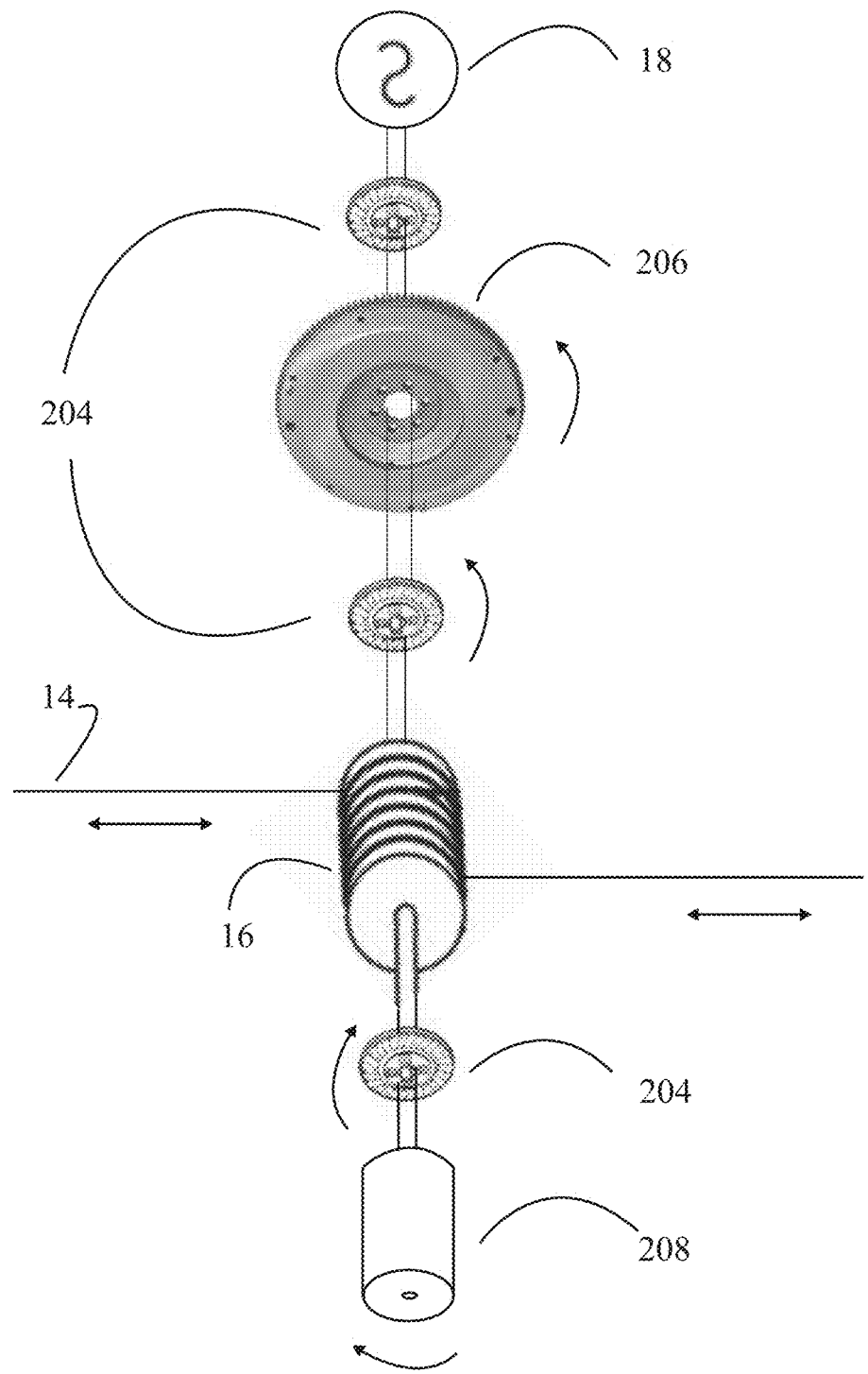

FIG. 7 is a perspective view of an alternative embodiment of the gyroglider for use in a system in accordance with the invention, including spur gears operating on tracks, the tracks disposed along the frame of the gyroglider aircraft in order to control pitch and roll orientations of the aircraft frame. While this embodiment also includes a 'resting' location in the tracks devoted to aircraft pitch control, the tracks change radius in order to provide a preferential pull location to which the aircraft frame may tend, due to the lower location thereof in the track;

FIG. 8 is a perspective view of an alternative embodiment of a rotor, and includes a frame reduced to a minimum mechanical structure secured to a tether, and providing for pitch control by an actuator acting between the minimalist frame and a boom connected to an inner, substantially stationary, bearing system of a hub of the gyroglider;

FIG. 9 is a perspective view of an alternative embodiment of the apparatus of FIG. 8, including a pass-through of the tethered line to secure another gyroglider at higher altitude on the same tether;

FIG. 10 is a perspective view of an alternative embodiment of the gyroglider, similar to the apparatus in FIG. 6 having a tiltable deck that pitches with respect to the main frame, in order to provide additional control of the rotor angle of attack or rotor pitch with respect to the incoming air stream;

FIG. 11 is a top plan view of one embodiment of a rotor using pivots canted away from perpendicular to a radius from the center of the hub, in order to provide a coupling of the flapping or hinged action of the individual blades, with the change of the blade angle of attack;

FIG. 12 is a top plan view of an alternative embodiment of the apparatus in FIG. 11, showing optional power generation schemes, including magnets and coils, as well as an optional jet, where the coils and jet need not be used in combination, but rather the coil system may provide auxiliary electricity for operating supporting equipment such as controls or autopilot on board the rotorcraft, while a jet may be used for controlling flight during startup, flydown, or the like;

FIG. 13 is a top plan view of an alternative embodiment of a rotor, including the central hub, the pivot points between the tubes or anchors on the hub and the rotor blades, in this case having hinge axes perpendicular to a radius from the center of the hub, but the blades themselves canted at an angle forward in the leading edge direction instead of on the radii emanating from the hub;

FIG. 14 is a perspective, partially cut away view of an alternative embodiment of a rotor, with the blades truncated in order to expand the viewing size of the hub, the hub including anchors that serve the purpose of a clevis to hold the trunnions for connecting the respective blades, and the blades pivoting about pivot pins passing through the anchors;

FIGS. 15A-15B are side elevation views of an alternative embodiment of the gyroglider in accordance with the invention, having a tethered frame supporting a rotor, and including biasing elements such as springs, mechanical actuators, servos and the like, in order to bias each blade to an upward position, the upward position thus coupling, due to a canting of the blade or the pivot of the blade, the blade angle of attack to the coning angle or the rise angle of each blade with respect to the hub, outside of the normal theoretical plane of rotation of a hub and blades of the rotor;

FIGS. 16-17 are perspective views of a launching and landing structure illustrating several optional developments in order to assist in launching and landing gyroglider of systems in accordance with the invention, these systems providing an optional turntable to support turning the gyroglider into the wind or allowing the vertical rudder vane of the gyroglider to turn the gyroglider and the turntable into the wind to begin or terminate flight, this structural system also including a pivoting landing deck supported on the turntable to permit landing legs of the gyroglider to contact the landing deck without requiring that the gyroglider rotor change its angle of attack with respect to the incoming wind at landing, rather the gyroglider can land at a particular angle suitable to the angles of the tether and rotary wing, after which the gyroglider may be secured to the landing deck, and the landing deck may be tilted to an appropriate angle for storage, service, or the like;

FIG. 18 is a perspective view of an alternative embodiment of the gyroglider system in accordance with the invention, illustrating the capstan and a motor-generator system connected thereto, this capstan system also includes a storage reel in order that the gyroglider be drawn down to the ground, or flown down towards the ground, and may be disassembled, the rotors remaining threaded on the tether for compact storage, while the frames or fuselages of the gyroglider may be removed for storage to a different location or a nearby location;

FIG. 19 is a perspective view of one embodiment of the gyroglider of FIG. 18, illustrating more details of the connection scheme between the frame and the rotor;

FIG. 20 is a flow diagram of a control scheme for managing tension in a tether of an invention of an apparatus in accordance with the invention;

FIGS. 21A-21D are the top plan view of a frame of the gyroglider, a side elevation view, a front elevation view and a perspective view of the same gyroglider, respectively, relying on a bridle system to both connect the tether to the gyroglider for generating power, as well as to control the pitch, roll, or both of such an gyroglider by drawing and releasing the bridle cords or lines that connect to the various and extreme aspects of the gyroglider;

FIG. 22A illustrates a rope tank storage device in accordance with the present invention with a power roller that spins either clockwise or counter clockwise to lay the tether into the tank;

FIG. 22B illustrates a rope tank storage device in accordance with the present invention with a power roller that raises or lowers a center pillar to minimize the distance of fall of the tether into the tank;

FIG. 23 illustrates the gyroglider apparatus in accordance with an embodiment of the present invention with the Center of Gravity (CoG) weight shift and an alternate upside down horizontal stabilizer to control flight stability;

FIG. 24 illustrates a landing/launching fixture that allows the gyroglider apparatus in accordance with the present invention to take off or land on a single fixture that could be located on a building, a barge or a boat;

FIG. 25 illustrates roll control for a gyroglider apparatus with two line bridles in accordance with an embodiment of the present invention;

FIG. 26 illustrates the gyroglider apparatus in accordance with the present invention being provided with a flywheel and clutches to even out the power generated;

FIG. 27A illustrates a graphical representation of a comparison of the relative wind experienced by the gyroglider in accordance with the present invention, with and without cross wind maneuvering;

FIG. 27B illustrates a graphical representation of rotor bank angle of the gyroglider in accordance with the present invention versus time during a cross wind maneuver;

FIG. 27C illustrates a graphical representation of rotor pitch of the gyroglider in accordance with the present invention versus time during a cross wind maneuver;

FIG. 27D illustrates a graphical representation of the cross range versus down range of the gyroglider in accordance with the present invention during a cross wind maneuver; and FIG. 27E illustrates a graphical representation of the attitude versus cross range of the gyroglider in accordance with the present invention during a cross wind maneuver.

DETAILED DESCRIPTION

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Autogyro aircraft are described in considerable detail in U.S. Pat. No. 5,301,900 to Groen et al. which patent is incorporated herein by reference. Likewise, numerous patents of de la Cierva, Pitcairn, Barltrop and others have attempted to capture wind energy.

The embodiments of the present invention are explained herein below with reference to the accompanying drawings. The term 'wind' in this specification is used to refer to a fluid with current such as air, moisture laden air and liquids including water.

Figure 1:
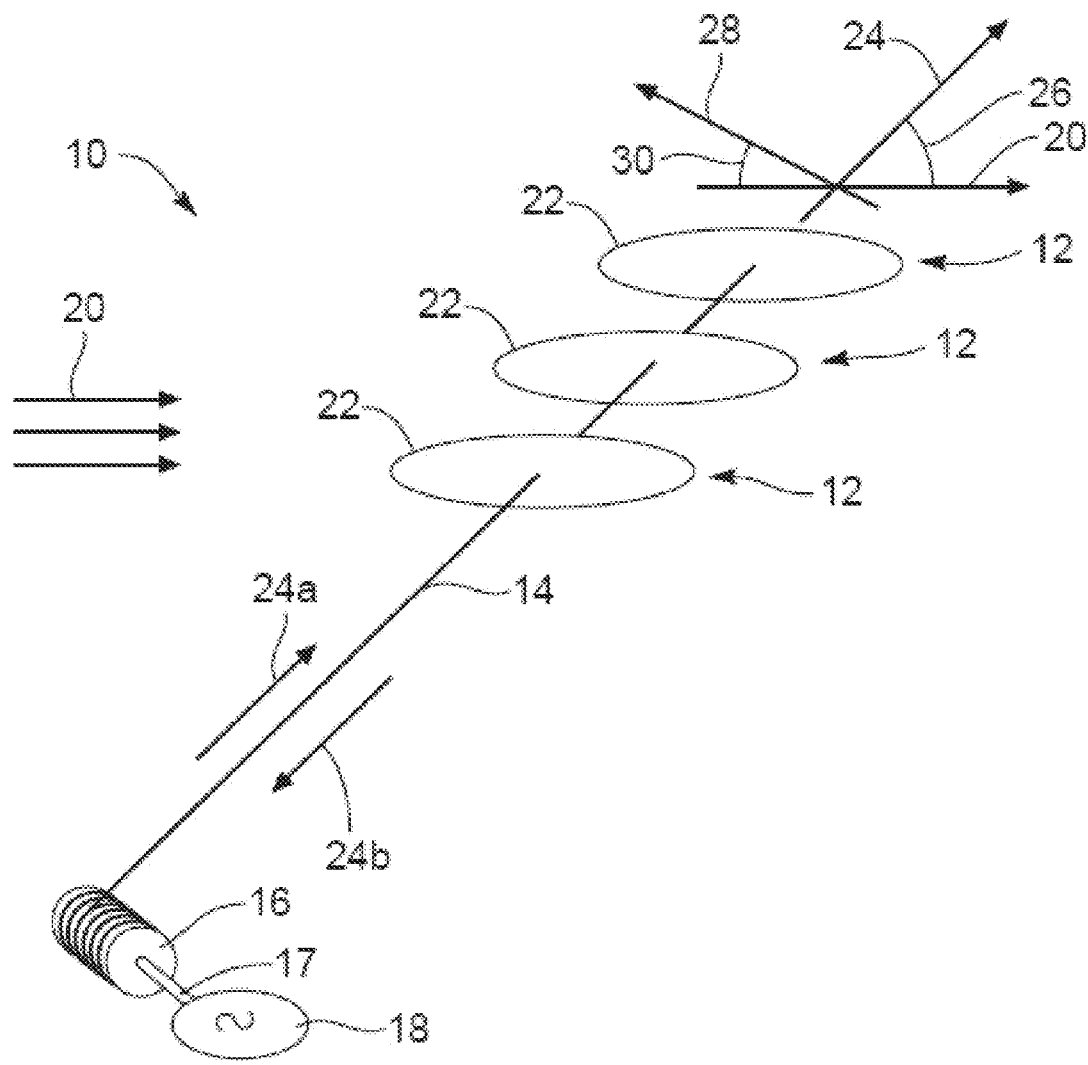

Referring to FIG. 1, while referring generally to FIGS. 1-21, at least one gyroglider 12 is secured by a tether 14. Gyroglider 12 as referred to in the specification would mean one or multiple gyrogliders forming a gyroglider system. The tether 14 is formed of a natural or synthetic material. The tether 14 is a steel cable or synthetic polymeric fiber braided into ropes. For instance, the Dyneema™ brand cord can be braided into ropes of different diameters. Ultra high strength, ultra high thermal and flame resistance fiber like Dupont's M5 rope and carbon nanotube rope can also be used as a tether. Such materials provide extremely long life, durability, high strength, suitable wear characteristics, and have substantially lighter weight than steel cables and the like.

The tether 14 is wound around a take—up device or capstan 16 which is preferably in the form of a reel, spool, sheave, and the like. The capstan 16 is adapted to provide a mechanism for taking in the line of the tether 14 and laying it systematically and uniformly in layers. Sophisticated technologies in the wire and cable industry, the design of fishing reels, and the like have dealt with the problem of reeving line onto a spool, pulley, or reel in a neat, orderly, and removable fashion.

A "rope tank", "rock climbers or fire rescue rope bag" concept of tether storage includes a rope bag which is a precisely sized fully enclosed bag with a very small opening for the rope to be fed into and pulled out of the bag. If a 100 m rope is fed in through a small opening, it does not entangle and can be pulled out through the same hole. The rope is arranged in the bag such that the first end of the rope fed in the hole will be the last end to be pulled out.

Traditional rope/tether storage methods involve wrapping the tether onto a large rotating spool with a level winder mechanism that insures the rope is laid down in neat rows and does not get twisted. Traditionally known tether storage methods when used with the gyroglider apparatus in accordance with the present invention poses multiple problems. Firstly, in all embodiments of the present invention, the tether goes through a few wraps around a capstan for converting the high line tension into rotary power that is used to generate power. The capstan is also used in reverse wherein a motor rewinds the tether. After being wound through the capstan, the line has little tension left. The full length of approximately 10 km of tether weighs up to 25,000 kilos. After leaving the capstan, if the tether is wound onto a large spool with a level winding mechanism as known in the art, the spool needs to be very large and that results in wastage of a lot of power for careful winding in and winding out all of this weight at speeds upwards to 40 km/hr. Braking the momentum is also an issue when conventional rope storage methods are used in the gyroglider apparatus of the present invention.

In accordance with the present invention, a rope tank is envisaged to solve the above mentioned drawback of the prior art as illustrated in FIGS. 22A and 22B. After the tether 14 runs through a capstan winch 16 and the high tension is removed, the tether 14 is stored in a round cylindrical tank 2 with the help of gravity. The tether 14 is fed in to the tank 2 with the aid of a power roller, pulleys and guides. The circumference of the tank 2 is precisely predetermined to be slightly larger than the natural coiling diameter of the tether 14. For instance, the natural coiling diameter of a tank with 5 cm thick tether is 1.5 meters in diameter. So the tank is designed to have 1.6 meters diameter and the height of the tank is decided to be adequate for the amount of rope to be stored, say 10 meters high. A center pillar 4 with a cylindrical wall is provided coaxially in the larger 1.6 meter diameter tank. The center pillar 4 is designed to have approximately 0.5 meters diameter to prevent doubling back or figure eighting of the tether as it is laid down into the tank 2.

The power roller 6 that feeds or "spits" the tether 14 into the tank 2 is provided on approximately the top of the center pillar 4. In accordance with the embodiment illustrated in FIG. 22A, the power roller 6 rotates clockwise or anticlockwise to feed in or draw out the tether 14 through the void between the two cylinders. The cylinders are provided either underground or as part of the tower or the buoy or ship.

When the out-bound power stroke begins, the tether 14 is pulled back out of the tank 2 with the power roller 6 keeping back tension on the capstan 16 for good power transfer. For the in-bound rewind stroke the capstan 16 pulls the tether 14 down and the power roller 6 still keeps back tension on the capstan 16 but also spits the tether 14 down into the cylinder 2 in a circular pattern. This tether storage system uses very little power. The sides of the tank 2 and the walls of the center pillar 4 are coated with Teflon or other friction reducing coating to minimize friction and heat buildup with the tether. Thus heat dissipation is quick and there is practically no momentum; tether pull out or release can thus be instantly reversed. The rope tank in accordance with the present invention is a very simple and economical means to store the tether. Furthermore, since heat dissipation is taken care of, the life of the tether is not compensated by the storage means.

In accordance with the embodiment illustrated in FIG. 22B, the power roller 6 and hence the center pillar 4 are raised or lowered inside the rope tank 2 to minimize the distance the tether 14 falls from the power roller 6 to settling in the bottom of the tank 2. By keeping the distance of fall of the tether short, chances of tangling of the tether 14 is considerably reduced.

A connector 17 physically connects the capstan 16 to a converter 18. The converter 18 is typically a means that can suitably convert rotational energy from the capstan 16 to a transmissible form, a storable form, or both. Accordingly, the converter 18 is an electrical generator, a hydraulic motor or a gas compressor. When the converter 18 is an electrical generator, the rotary power delivered by the capstan 16 through the connector 7 is converted into electrical power suitable for introduction back into the electrical grid of a local, state, or national electrical distribution infrastructure.

The system 10 operates by flying the gyroglider 12 upward against tension created in the tether 14. Accordingly, force, operating through a distance, creates energy. That amount of energy delivered over a period of time constitutes power. The connector 17 delivers power to the converter 18 based on the tension in the tether 14 and the rotary motion of the capstan 16. Thus, the gyroglider 12, flown by virtue of its lift, applies a force on the tether 14, which is delivered as power based on the payout of the tether 14 by the capstan 16 against the resistance of the converter 18.

The gyroglider 12 is retrieved by the tether 14 by operating the converter 18 in reverse. For instance, if the converter 18 is a motor-generator apparatus, it operates as a motor when current is delivered to it and as a generator when mechanical force is applied to it and a load is connected electrically to draw the electricity from the apparatus operating in generator mode. The gyroglider 12 is piloted using a computerized control mechanism or in an autopilot mode. In a cyclically alternating operation (motor mode and generator mode), the converter 18 operates as a motor in one mode, while the automatic controls on the gyroglider 12 effectively fly the gyroglider downward, maintaining only a minimal amount of tension on the tether 14.

Thus, the net gain of energy results from a comparatively larger tension in the tether 14 exerted by one or more gyrogliders 12 being lifted on the tether 14 and thus applying a force thereto, in contrast to the comparatively lighter force maintained in the tether 14 as one or more gyrogliders 12 are flown back closer to the earth in order to retrieve the tether 14 on the capstan 16.

Thus, a comparatively large force is applied during payout of the tether line 14, providing power. A comparatively small amount of power is used in reeling in the tether line 14 on the capstan 16 in preparation for another lifting flight by the gyroglider 12.

In the illustrated embodiment of FIG. 1, the direction of the wind 20 is generally considered as operating parallel to the surface of the earth and the gyroglider 12 will typically be oriented to fly 'into' the direction of the wind 20.

The gyroglider 12 includes a fixed wing aircraft. In a preferred embodiment of the present invention, each gyroglider 12 includes a rotary wing, referred to as a rotor 22. The rotor 22 operates by spinning resulting in auto rotation. The rotor 22 rotates in a substantially planar region about the plane of rotation 28. Practically, some rotors may have degrees of flexibility that permit them to literally operate in a somewhat conical configuration at times.

In general, the tether 14 extends in a direction 24. The direction 24a represents the outward direction of payout of the tether 14 as the gyroglider 12 operates in a maximum lift orientation to draw the tether 14 out from the capstan 16. The direction 24b represents the direction in which the tether 14 reels in under minimum tension while the gyroglider 12 is caused to fly downward with a minimum lift.

Practically, the direction 24 may change slightly along the path. The tether 14 does not have zero weight. Accordingly, the tether will not travel along an exactly straight line but may suspend as a catenary. Nevertheless, at any point along the tether 14, a direction 24 is established.

The direction 24 also helps establish an angle 26 between the direction 24 of the tether 14, and a datum, such as the surface of the earth. As such, the wind direction 20 establishes an angle 26 with the tether direction 24. The angle 26, thus, defines a relationship with the relative wind direction 20.

Typically, the rotor 22 and the plane of rotation 28 form an angle 30 with the direction of wind 20. Thus, the gyroglider 12 relies on the positive angle 30 for the air to pass up through the rotor, thus windmilling or auto-rotating the rotor 22. The auto-rotation of the rotor 22 by the wind 20 treats each blade 32 (FIG. 2) of the rotor 22 like the wind treats the sail of a boat. The net momentum transfer to the blade 32 (FIG. 2) by the wind 20 as the wind changes direction motivates the blade 32 to (FIG. 2) to move in a direction opposite from the direction in which the wind is deflected.

Figure 2:
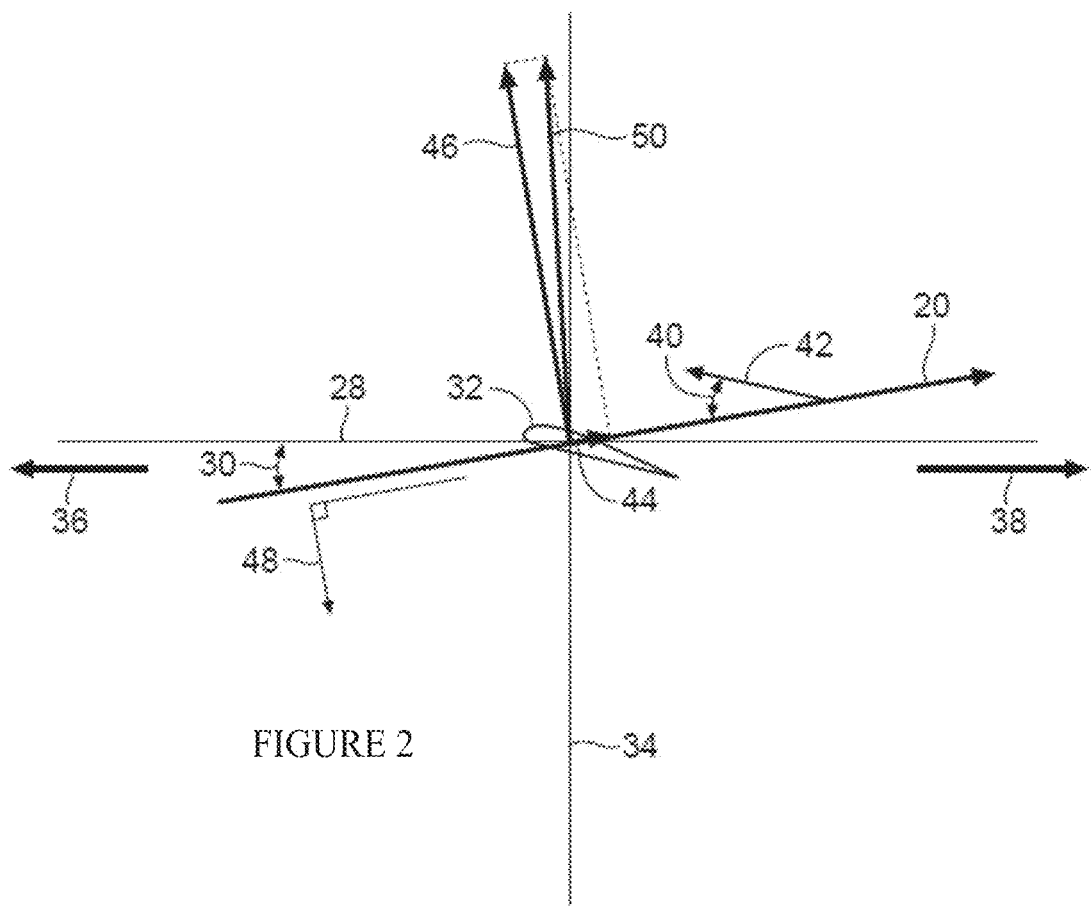
FIG. 2 illustrates the net resultant of the forces of lift, drag, and gravity with respect to the rotating blade of the rotor of FIG. 1.

Thus, the rotation of individual blades 32 (FIG. 2) of each rotor 22 gives a net velocity to each blade 32 (FIG. 2). Each blade 32 (FIG. 2) is formed as an air foil causing the air flowing over the top of the blade 32 to travel faster than the air flowing under the blade 32. According to the Bernoulli Effect, there will be less pressure on the top than on the bottom of the blade 32, resulting in a lift force on the blade 32. Thus, each rotor 22 is moved forward like a windmill by the wind passing upward through the rotor 22 from the underside thereof.

Referring to FIG. 2, the blade 32 of the rotor 22 typically rotates in a plane about the plane of rotation 28. When the rotor blade 32 rotates at a very low speed, the incoming wind 20 alters the pitch of the blade 32, or the blade angle of attack 40. Thus, the rotor 22, if it relies on blades that are free to flap up and down throughout some range of motion on a hinge, may actually form something of a cone, rather than a plane.

Nevertheless, any point on the rotor blade may be thought of as rotating in a particular plane. Thus, when one views the blade 32 of FIG. 2, with its axis of rotation 34, the forward direction 36 in which the blade travels stands opposed to the retreating direction 38 that the blade travels in the course of its rotation.

Thus, the incoming wind 20 below the blade 32 results in a blade angle of attack 40 describing the very local pitch of the blade 32 with respect to the incoming wind. The blade angle of attack 40 may be thought of as the chord direction 42 with respect to the wind direction 20. That angle 40 establishes the blade angle of attack 40.

According to Bernoulli Effect, as described by the Bernoulli equation, the passage of the wind 20 over the top of the blade 32 results in a reduction of pressure on the upper side of the blade 32, thus generating a lift force. The lift force 46 acts upwardly while the wind 20 also asserts a certain amount of drag against the blade 32. Thus, the blade is subjected to a drag force 44 in the direction of the wind 20, while the lift force 46 operates substantially perpendicularly thereto, tending to lift the blade 32.

In general, one may think of wind as operating within the nap of the Earth, and therefore operating substantially horizontally with respect to the Earth. In the illustration of FIG. 2, the force of gravity is not aligned with the axis of rotation 34 of the blade 32 and rotor 22. Rather, the gravitational force 48 operates as shown in FIG. 2, because the blade 32 is typically oriented with a positive angle of attack 40 with respect to the incoming wind, which wind must come through the bottom side or face of the blade 32.

The resultant force 50 becomes the net force on the blade 32, and the combination of the forces 50 on the various blades 32, whether 2, 4, 5, or more, then results in an ultimate force. The direction of flight of the gyroglider 12 is generally against the incoming wind 20. This is for the same reason that the wind direction is substantially parallel to the Earth.

For example, an aircraft travels at an altitude with respect to the surface of the Earth. In a free flying gyroglider, without the tether, the net resultant force is upward due to the lift force, but backward, contrary to the direction of motion, as a result of the drag force. In a free flying aircraft, the drag force is overcome by the force of a tractor motor in front of or behind the aircraft. In accordance with the present invention, the tether 14 and the tension therein provide the force resisting both the upward lift force 46, and the drag force 44. Accordingly, the resultant force 50 is the force available to lift the gyroglider and also to support the tension in the tether 14.

Figure 3:
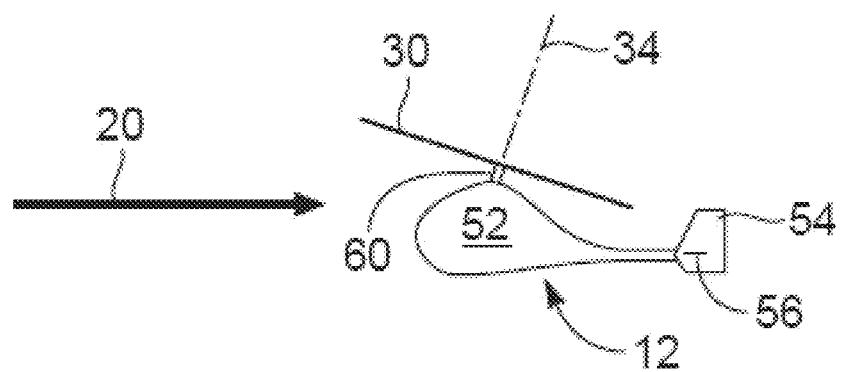
FIG. 3 is a schematic diagram illustrating the gyroglider of FIG. 1 provided with a rudder and an elevator in accordance with an embodiment of the present invention.

Referring to FIG. 3, the gyroglider 12 is provided with a frame or fuselage 52. A frame generally provides support for a load, equipment, and the like. Such a frame when provided with a skin is often referred to as to fuselage. Nevertheless, the terms frame and fuselage are used interchangeably in this specification and generally referred to by the numeral 52.

In accordance with an embodiment of the invention, the frame or fuselage 52 includes a vane or rudder 54, and an elevator 56. The rudder 54 operates as a vertical vane, while the elevator 56 operates as horizontal vane.

Figure 4:
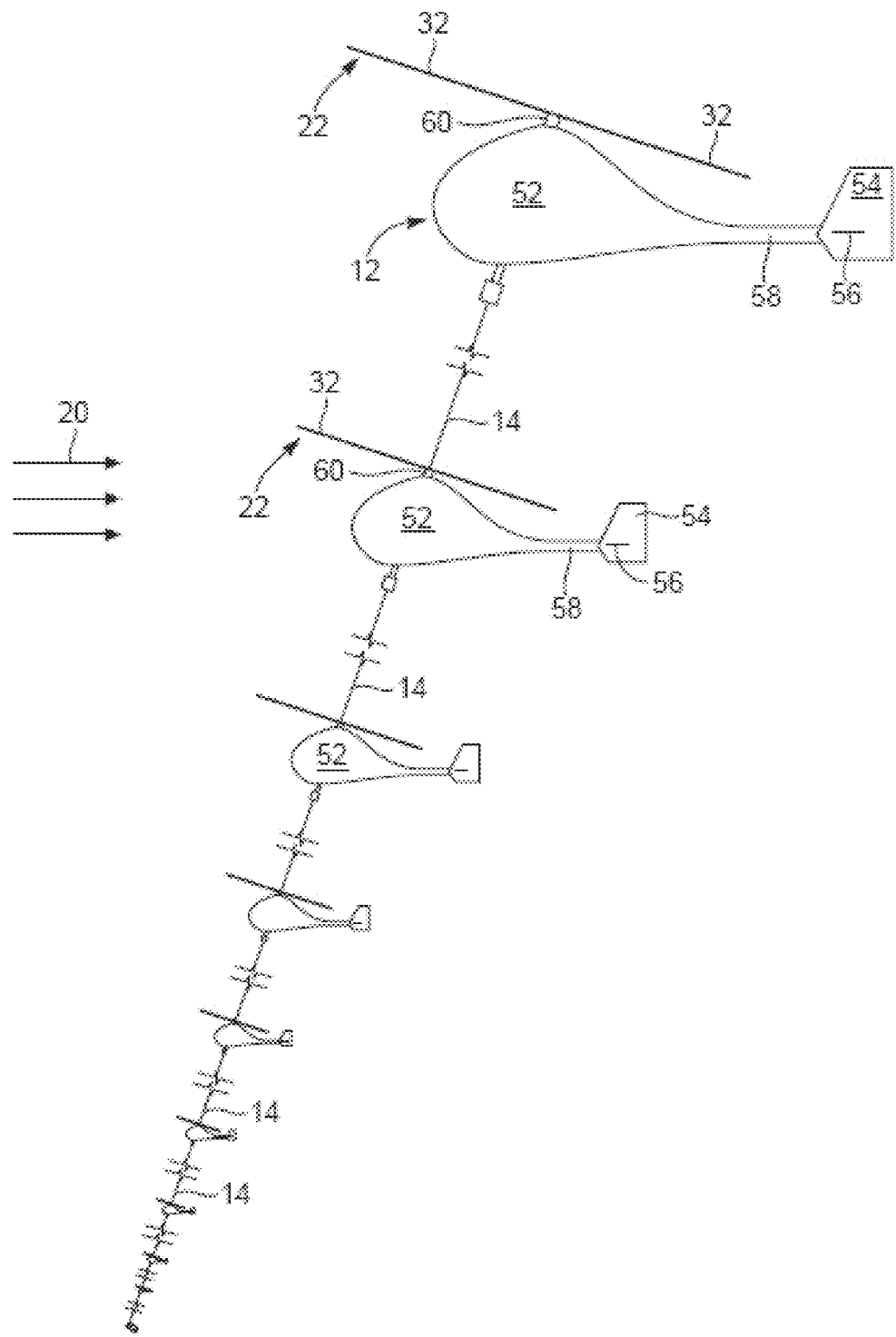
FIG. 4 is a schematic diagram of a system in accordance with FIG. 1 including multiple gyrogliders attached to a single tether and together providing a net tension in the line as seen by the capstan and power generation system (converter) connected thereto.

By mounting the rudder 54, the elevator 56, or both near one extremity of a boom 58 (FIG. 4), with the opposite end of boom 58 (FIG. 4) secured closer to the frame or fuselage 52, each of the vertical vane 54 and the horizontal vane 56 obtain greater leverage to orient the fuselage or frame 52 with respect to the wind 20 and rotor 22. In certain embodiments, the rotor 22 rotates on or about a mast 60 (FIG. 4). The mast 60 (FIG. 4) operates to secure the rotor 22 to the fuselage 52.

Since the rotor 22 operates as a rotary wing, no power needs to be transmitted through the mast 60. Thus, the rotor 22 rotates on a bearing fixed at its inner race to the mast 60 (FIG. 4). Alternatively, the mast is supported on a system of bearings so that the mast 60 (FIG. 4) itself is permitted to pivot or even rotate with the rotor blades 32.

Referring to FIG. 4, while continuing to refer generally to FIGS. 1-21, multiple gyrogliders 12 are connected to the tether 14. The various gyrogliders 12 are 'threaded' on to the tether 14. Each gyroglider 12 is flown aloft, by securing it to the tether 14, and being lifted by the previously lofted gyroglider 12.

Typically, the blade angle of attack 40 for the blades 32 of each of the rotors is set at a sufficiently low or even negative angle of attack 40 to encourage autorotation. Thereafter, as the rotor 22 begins to turn at an appropriate rate, the blades 32 tend to extend straight out in a plane of rotation 28, with each blade 32 operating at the angle of attack 40 selected.

The angle of attack 40 of an individual blade tends to control the lifting force 46 applied by overflowing air to that blade. The increase in the rotor angle of attack 30 tends to increase the drag, by presenting a greater projected area of the rotor 22 to the incoming wind 20. Thus, in order to initiate autorotation, the gyroglider 12 near the ground is tilted to provide a greater angle of attack 30 corresponding to the entire area of the rotor projected onto the wind direction.

Practically, multiple gyrogliders 12 connected to the tether must each be lifted off or flown upward, after which another gyroglider is launched. If an array of gyrogliders 12 is set up along a horizontal surface, each could lift the subsequent one located beside it, as the relatively upward or higher adjacent gyroglider 12 increases the tension in the tether 14 between itself and the next adjacent gyroglider 12. Then the lower or comparably lower gyroglider would be lifted up. Some difficulties with orientation and the like are solved by providing platforms, launch mechanisms, and the like in order to maintain proper orientation and minimize any sudden load applied to the gyroglider 12.

Nevertheless, by controlling the rotor angle of attack 30, autorotation is initiated as the blade 32 turns about a theoretical axis of rotation 34 that is exactly horizontal. It would effectively act as a windmill as used in earthbound systems. Thus, somewhere between a horizontal axis of rotation 34, and a vertical axis of rotation 34, is a suitable startup angle for the rotor 22 in order to begin autorotation driven by the incoming wind 20 there below.

As the rotor 22 increases its angular velocity, the blade angle of attack 40 is reduced, and the rotor angle of attack 30 is also reduced. In some embodiments, such as the 'delta' rotor concept, the rotor angle of attack 30 and the blade angle of attack 40 are coupled. In other embodiments, the rotor angle of attack 30 is controlled completely separately from the blade angle of attack 40.

The multiplicity of gyrogliders 12 pulling against the tether 14 will apply a cumulative force equal to all of the total lifting forces 46, against all of the combined drag forces 44, thus providing a net resultant lift force 50 on the tether 14 as applied by all of the gyrogliders 12 flying there above.

Figure 5A:
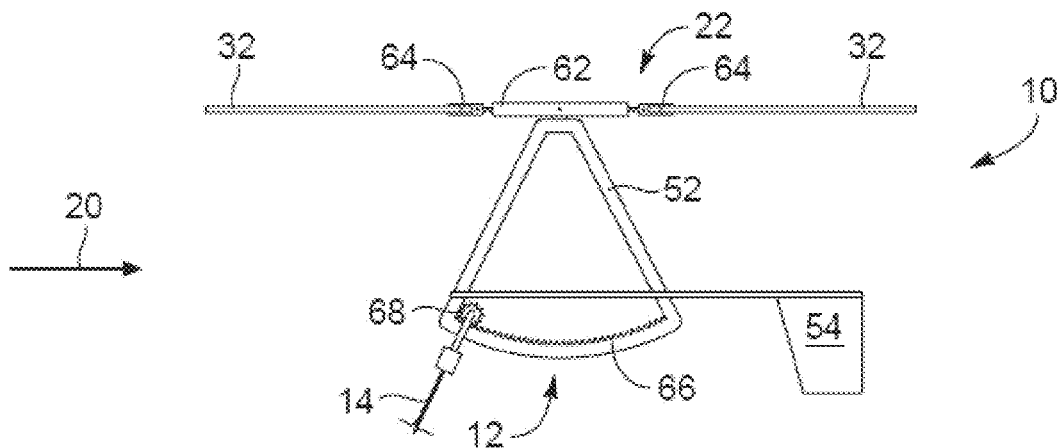
FIGS. 5A-5C are side elevation views of a specific embodiment of a gyroglider in accordance with the invention in various attitudes of flight ranging from stabilized, almost level flight to an aggressive attitude to an initiation or gyroglider position for launching.
Figure 5B:
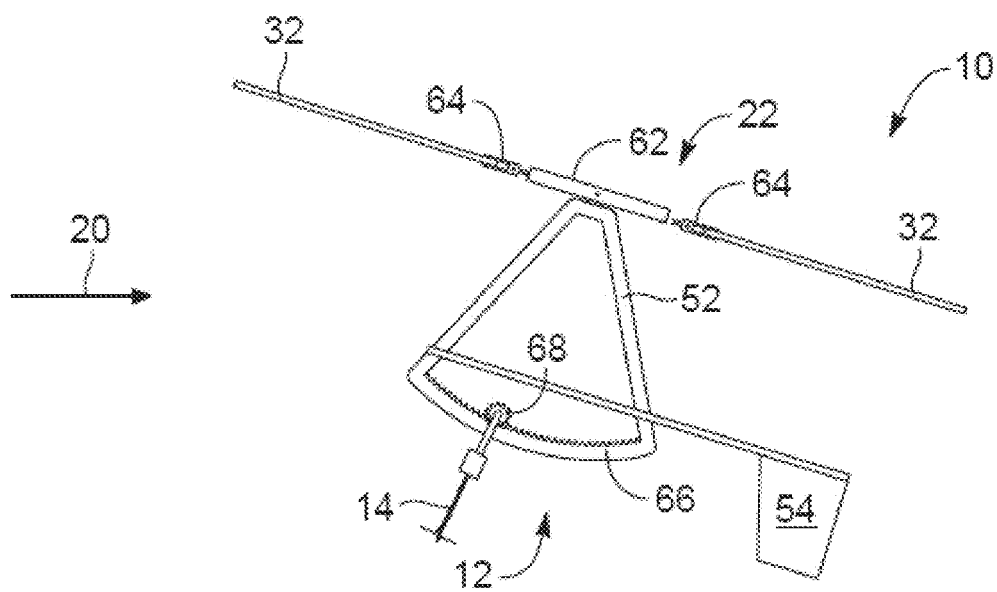
Figure 5C:
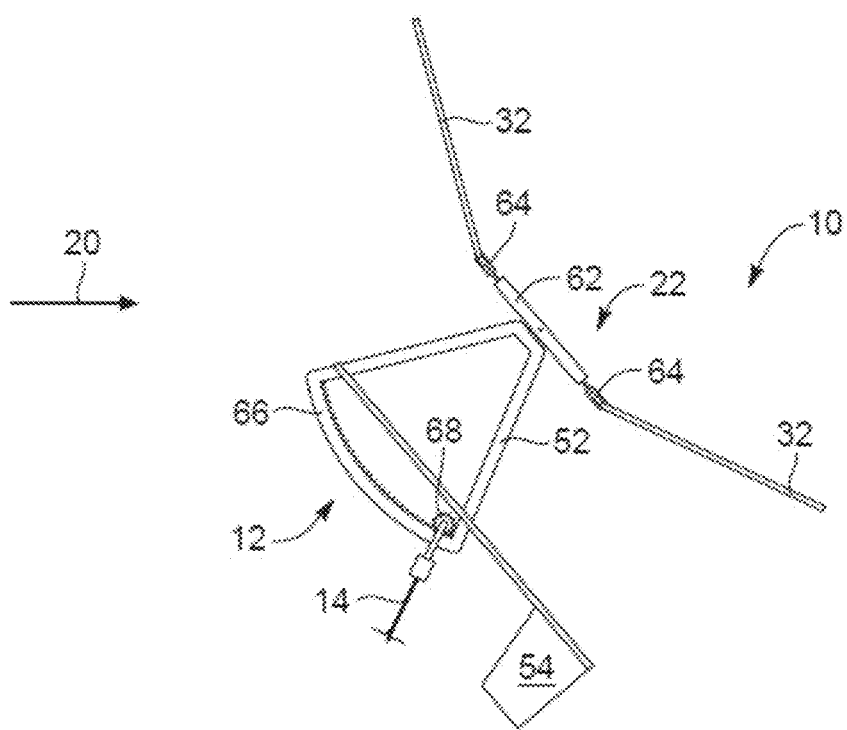

Referring to FIGS. 5A-5C, while continuing to refer generally to FIGS. 1-21, the gyroglider 12 in one embodiment is oriented by controlling the pitch of the gyroglider 12. For example, as illustrated in FIG. 5A the rotor angle of attack 30 may be brought down to a value of zero or less with respect to incoming wind. In this arrangement, the gyroglider 12 will slowly drift out of the sky. The only lift force will be by virtue of rotation of the rotary wing or rotor 22 as a result of air passing over blades 32 of the rotor 22. Also illustrated in FIG. 5A is a hub 62 operating to rotate with respect to the frame 52 or fuselage 52 of the gyroglider 12. Pivots 64 between each of the blades 32 and the hub 62 provide a "flapping" motion for each hinged blade 32. Accordingly, each blade 32 rises to a desired angle with respect to the hub 62.

A pinion or spur gear 68 operates along a track 66 to change the pitch of the gyroglider 12. In this embodiment, the pitch of the aircraft controls the orientation of the hub 62.

Accordingly, the blade angle of attack 40, if coupled to the rotor angle of attack 30 will be affected by the pitching of the gyroglider 12.

For example, referring to FIG. 5B, in the illustrated attitude, the direction of the incoming wind 20 passes upward through the rotor 22. At a sufficiently high speed, centrifugal forces tend to stress the blades 32 and motivate them to extend exactly straight out from the hub 62. In the illustration of FIG. 5B, the wind 20 passes through the rotor 22 and its associated blades 32 in an upward direction. Thus, the incoming wind 20 tends to auto rotate the blades. The blades, due to their selected blade angle of attack or blade pitch 40, then begin to exert a lift on the frame or fuselage 52 as a direct result of the Bernoulli Effect. The pinion 68 is operated by a servo to travel along the track 66, thus controlling the rotor angle of attack 30 of the gyroglider 12.

Referring to FIG. 5C, the gyroglider 12 in one embodiment of the system 10, is pitched with the rotor 22 in an extreme attitude. For example, hinged blades 32 pivot at the pivots 64 between the blades 32 and the hub 62. Accordingly, if the centrifugal force is small, due to the slow rotational speed, down to a zero rotational speed, then the drag force 44 acting on the blades 32 'deflect' or lift the blades at the pivots 64 into more of a coning shape, rather than the familiar plane of rotation 28, and push them around like a windmill.

Thus, the pinion 68 operating along the track 66 pitches the gyroglider in a very steep attitude with respect to the incoming wind 20, thus causing the rotor 22 or the blades 32 to 'windmill' or auto rotate. The rising of the blades 32 on the pivots 64 away from the frame 52 of the gyroglider 12 results in a changed angle of pitch 40 of each of the blades 32. Accordingly, in the absence of a positive angle of attack, the blades 32 provide no net lifting force 46, while simply auto rotating (like sails of a boat or windmill) in response to the momentum transfer from the incoming wind 20. As the rotational velocity or angular velocity of the rotor 22 increases, from the attitude of FIG. 5C to the attitude FIG. 5B the blade 32 has increased speed. Centrifugal forces will hold the blades 32 in full extension away from the hub 62 of the gyroglider 12. In the illustrated embodiment of FIG. 5, the rudder 54 operates to orient the frame 52 and thus the rotor.

Referring to FIG. 6, while continuing to refer generally to FIGS. 1-21, another embodiment of the system 10 in accordance with the invention relies on pitch controllers 70 operating along rails 66. The rails 66 are either provided with teeth, or are smooth. In either event, rollers or pinions 68 within the controllers 70 operate to move the controllers 70 back and forth along the rails 66 of the frame 52.

In the embodiment illustrated in FIGS. 5A-5C, the rudder 54 exclusively pivots the gyroglider 12 with respect to the tether 14. Unlike that, in the embodiment of FIG. 6, the tether 14 is provided with another controller 72 to control the roll of the gyroglider, the controller 70 being a pitch controller. The roll controller 72 operates on a track 76 extending between the pitch controllers 70. The frame maintains a spread angle 71 between the front and rear portions of the frame 52 that establishes the length or the circumference of the track 66 that is used for pitch control. Likewise, the angle 74 between the right and left portions of the frame 52 which acts as spread angle for providing roll control by the roll controller 72 operating along the roll track 76. In the illustrated embodiment, the blade pitch angle 40 or blade angle of attack 40 is established independently from any other rotor angle of attack 30 that may be set for the gyroglider 12.

In the illustrated embodiment, the blade angle of attack 40 is set for each blade 32 in order to assure that the rotor 22 will auto rotate. Thereafter, the blade angle of attack 40 is increased to a net positive angle with respect to the incoming wind 20 against the leading edge 77 of a rotating blade 32, when the blade 32 is advancing forward in the same direction of the flight of the gyroglider 12.

When the gyroglider 12 is tethered to the tether 14, the advancing blade 32 has a leading edge 77 flying into the incoming air stream. Meanwhile, another blade 32 is a retreating blade 32, retreating with a different relative wind, because the net relative air speed of the blade 32 is a combination of the speed of the gyroglider 12 with respect to the incoming wind 20 plus the respective velocity of the advancing blade 32 with respect to the frame 52. Similarly, the retreating blade 32 travels in the retreating direction 38 illustrated in FIG. 2. Thus, the velocity of the gyroglider 12 is positive with respect to the incoming wind 20, while the blade velocity is negative with respect to the gyroglider.

In the illustrated embodiment, the rudder 54 and elevator 56 are used to orient or trim the gyroglider 12 to fly into the wind. Nevertheless, the roll controller 72 is used to control the side-to-side attitude of the aircraft and its associated rotor 22. Meanwhile the pitch controllers 70 operate along the rail 66 to establish the rotor angle of attack 30 of the aircraft. As stated, the embodiment of FIG. 6 includes a controller either within the rotor, or attached to the hub 62 in order to individually alter the blade angle of attack 40 of each individual blade 32.

The hub 62 is secured to a mount structure 60, typically a mast. In certain embodiments, the mast 60 is provided with a spherical bearing, bushing, or journal within the main bearing assembly of the hub 62. Thus, in certain embodiments, the hub 62 may stand off away from the frame 52 of the gyroglider 12, and permit the rotor 22 to seek its own suitable angle of roll.

For example, because the leading edge 77 tends to operate at a higher relative velocity with respect to the incoming wind 20, it tends to climb faster or fly upward to a greater extent. The relative wind velocity with respect to the forward moving or advancing blade 32 is the velocity of the gyroglider 12 with respect to the wind 20, plus the relative velocity of the blade 32 with respect to the aircraft frame 52. Thus, the forward speed of the gyroglider 12 adds to the forward speed of the rotating, advancing blade 32.

In contrast, the retreating blade 32 has a net velocity with respect to the incoming wind 20 of the forward speed of the aircraft frame 52, minus the linear velocity (angular velocity at a radius) resulting from the retreating blade. As a practical matter, the retreating blade relative velocity with respect to the gyroglider 12 is a speed in a backward direction. It is thus subtracted from the forward speed of the aircraft frame 52. Thus, the rotational velocity of any point on each blade 32 is added to (for an advancing blade) and subtracted from (for a retreating blade) the forward airspeed of the frame 52 of the gyroglider 12. Thus, the advancing blade 32 will tend to climb higher, while the retreating blade will tend to climb lower. There is a tendency for the rotor 22 to roll to a particular attitude with respect to the frame 52 that will leave the advancing blade extending upward at a higher angle, with the retreating blade extending downward at a lower angle with respect to the mast 60.

A mount 79 on top of the mast 60 provides a platform for mounting various control equipment, communications equipment, and the like. For example, certain blade pitch control mechanisms are connected to the mount 79. In other embodiments, such blade pitch control mechanisms are connected directly to the hub 62 in order to rotate with the rotor 22 and the blades 32.

Referring to FIG. 7, in one embodiment of the gyroglider 12 in accordance with the invention, the track 66 is provided with a forward portion 66a, and an aft portion 66b. Between the fore 66a and aft 66b portions of the track 66, is a detent or depressed area having a much smaller radius. Thus, the frame 52 of the gyroglider 12 is provided with a preferential position, favoring that particular orientation when restrained by a tether 14. As with the embodiment of FIG. 6, the embodiment of FIG. 7 has a leading edge 77 and a trailing edge 78 for each of the blades 32. The leading edge 77 tends to be comparably bluff. By contrast, the trailing edge 78 tends to be very thin and sharp. This arrangement is dictated by the aerodynamics of the airfoil or rotor blades, particularly one that must provide lift, while minimizing drag.

Similar to the embodiment of FIG. 6, the controllers 70, 72 include appropriate wheels or pinions 68 to operate along the tracks 66. Nevertheless, in this embodiment, the preferential "low spot" in the track 66 tends to leave the aircraft with a preferred position, maintained long term. Of course, the favored position is overridden by operating the controllers 70, 72 in order to pitch the frame 52 and consequently the rotor 22 at a different angle with respect to the incoming wind 20.

Referring to FIG. 8, in another embodiment, a delta type of hinged rotor 22 employs pivots 64 between the hub 62 and the blades 32. By constructing each of the pivots 64 to extend along a path that is canted with respect to a radius extending from the center of the hub 62, the rotor angle of attack 30 is coupled to the blade angle of attack 40.

The hub 62 of the gyroglider includes a bearing that provides reduced friction between the rotation of the rotor and the mast 60. The bearings are provided with an inner race 82 substantially fixed with respect to the rotation or lack thereof of the mast 60 (see FIGS. 11-14 for details of the bearings). The inner race 82 does not have any appreciable rotation with respect to the mast 60. Bearing rollers, whether they be thrust bearing rollers, ball bearings, Timken bearings, or the like operate between the inner race 82 and the outer race 86 containing them.

Therefore, in general, the bearings operate as the outer race 86 rotates about the inner race 82, while rollers 84 roll therebetween. In alternative embodiments, the inner race 82 rotates, while the outer race 86 remains fixed, while the bearing rollers 84 roll therebetween reducing the friction of the relative motion. In the present embodiment, where the rotor 22 operates about a mast 60, substantially fixed with respect to the frame 52, the outer race 86 moves with respect to the frame 52, while the inner race 82 remains substantially fixed with respect to the mast 60.

In accordance with another embodiment of the present invention, a spherical bearing permits pivoting of the rotor hub 62 in order to accommodate the necessary roll angle for the tendency of the advancing blade 32 to fly up and the retreating blade 32 to fly down with respect to one another.

Referring to FIG. 8, the direction 81 of rotation of the rotor 22 represents the rotation of the individual blades 32 in the rotational direction 81. In an attitude of initial flight, at slow speed, the individual blade 32 lifts upward or away from the ground or the tethered direction on the pivots 64. In the embodiments of FIGS. 7-9, the hub 62 includes a mount 88 on the mast 60 to which the bearing 80 is substantially secured. The mount 88 is be fabricated as a spherical bearing or pivot, about which the bearing 80 pivots, but does not rotate.

Meanwhile, as the rotor angle of attack 30 is initiated, a comparably slow rotation by the rotor 22 results in drag forces 44 acting against the rotor blades 32 to lift them away from the tether 14. Thus, the pivot 64 permits the individual blades 32 to windmill. However, upon pivoting of the blade 32 about the pivot 64, both the blade angle of attack and the rotor coning angle are affected.

For example, upon lifting of the tip of any blade 32 with respect to the hub 62, the blades 32 rotate in a conical sweep rather than a planar sweep. Furthermore, when the blade 32 pivots about the pivot 64, the angle formed between the radius and the axis of one of the pivots 64 causes a certain twist or change in the blade angle of attack 40 of each blade 32. Thus, any tendency of a blade 32 to fly up, or to be drifted up by the drag forces 44 of the incoming wind 20 tends to decrease the blade angle of attack 40, thus increasing the net momentum transfer of the incoming wind 20 put into rotation or auto rotation (sometimes called windmilling) of the blades 32 and the rotor 22.

In the embodiment of FIG. 8, the actuator 90 includes a movable element 92, and a housing 94 substantially fixed with respect to the frame 52 of the gyroglider 12. Here, the frame 52 is little more than a mere tube secured about the tether 14. Thus, the actuator 90, by extending the movable element 92, rotates the boom 58, fixed to the inner race 82 of the bearing 80. Accordingly, the inner race 82 is pivoted with respect to the mount 88, thus changing the pitch 30 of the entire rotor 22.

The rotor angle of attack 30 is modified by pitching the bearing 80 and the hub 62. When the hub 62 is pivoted about the mount 88, or when the entire frame 52 is pivoted as illustrated in FIGS. 5-7, in the pitching direction, or to modify the rotor angle of attack 30, the wind presents more drag against the underside of each of the blades 32. Meanwhile, the vertical vane such as the rudder 54, is also connected to the frame. Thus, the vane 54 maintains the orientation of the gyroglider 12 represented by the frame 52 and rotor 22 in the prevailing wind.

Typically, the profile or cross-section 95 of the individual blade 32 includes a spar 96 extending along the length of blade 32. A spar 96 provides stiffness against bending forces within the blade 32. In certain embodiments, the blade profile or cross-section 95 are solid. However, in most aircraft, the blade 32 is necessarily hollow to minimize weight. Thus, a spar 96 appropriately bisects or subdivides the chord of the airfoil or the rotor blade 32.

The chord represents a line-extending from the leading edge 77 to the trailing edge 78. The stiffness of the blade 32 along the chord is generally built into the skin, ribs, and so forth of the blade 32. In contrast, the bending forces typically require the spar 96 to support the bending loads that will otherwise be imposed by the lifting force 46 acting on the upper surface of each blade 32.

Referring to FIG. 9, in accordance with another embodiment of the present invention, a plurality of gyrogliders is threaded on the tether 14 in a series along the length thereof. A suitable length of the tether 14 separates adjacent rotors 22. Nevertheless, a frame 52 is constituted by a simple tubular structure fitted over the tether 14, and fixed thereto in order to secure the gyroglider to the tether 14.

Referring to FIG. 10, the frame 52 of the gyroglider 12 is provided with a platform 100. The platform 100 in previous embodiments is hardly visible at the top of the frame 52. The small fraction of the upper platform, fixed to the remaining structure of the frame 52 can be seen below the rotor hub 62.

In contrast, the embodiment of FIG. 10 includes an elongated platform 100 extending from a front end 103 to a back end 101. The region of the platform 100 near the front end 103 pitches about a pivot 102. Thus, the pitch angle 30 or the rotor angle of attack 30 is modified, without necessarily pitching the angle or attitude of the frame 52 of the gyroglider 12. A bias element 104 such as a spring, or the like, operates to urge the platform 100 into a particular attitude with respect to the remainder of the frame 52.

A stop on the frame 52 restrains the platform 100 from dropping below a substantially horizontal position as illustrated in FIG. 10. However, against the resistance or urging of the bias members or springs 104, the back end 101 of the platform 100 lifts away from the remainder of the frame 52 in order to change the rotor angle of attack 30 established by the axis 34 of rotation about which the rotor 22 rotates.

The platform 100 extends away from the pivot 102, placing the axis of rotation 34 at a distance 106. This distance or length (L) 106 represents the offset 108 between the pivot point 102 through which the axis of rotation 34 would normally pass in the frame 52 and the actual axis of rotation of the rotor 22. Meanwhile, the extension direction 105 of the pivoting of the platform 100 offsets the plane of rotation 28 of the hub 62 and rotor 22. This distance 108 by which the plane of rotation 28 is displaced above the pivot 102 or the neutral position or horizontal position of the platform 100 is a vertical offset distance 108 (D). The proportion of lift to drag of the rotor 22 is reflected in the ratio of the distance (L) 106 with respect to the distance (D) 108. Thus, the ratio of lift to drag is in the same proportion as the length 106 offset to the vertical displacement 108.

Referring to FIGS. 11-14, various embodiments of the hub 62 and the pivots 64 are employed. Likewise, various other accessories are implemented in the gyroglider 12 in accordance with the invention. For instance, in the embodiment of FIG. 11, a rotor 22 rotating in the direction 81 includes the leading edge 77 that actually pivots at a smaller radius than the trailing edge 78. This is because the pivot 64 is canted, rather than being perpendicular to a radius from the center of the hub 62 along the blade 32. The chord 109 of each blade 32 lies perpendicular to the radius 111.

Thus, because the angle of the pivot 64 is not parallel to the chord, the radius from the pivot 64 to the chord 109 is shorter along the leading edge 77, and longer, comparably, between the pivot 64 and the chord 109 along the trailing edge 78. Thus, one can see that the chord 109 changes its blade angle of attack 40 as the blade 32 pivots about the pivot 64.

Whenever the blade 32 pivots upward (out of the page) with respect to the pivot 64, and the hub 62, the leading edge 77 operates on smaller radius or distance between the pivot 64 and the chord 109. Thus, in an upward motion the trailing edge 78 tends to sweep through a greater distance corresponding to a larger radius between the chord 109 and the pivot 64.

This operation provides for greater negative angle of attack when the blades 32 are coned upward from the hub 62. A lower angle of attack 40 for each blade 32 will exist when each blade 32 is spinning flat in a plane passing through the hub 62. Thus, the blade angle of attack 40 is coupled to the pivoting of each blade 32 with respect to the pivot 64 and the hub 62.

Referring to FIG. 12, in accordance with one more embodiment, a generator 110 provides operational power needed to operate instrumentation and control equipment associated with the gyroglider 12, and its rotor 22. For example, power for operating an autopilot to fly the gyroglider 12 up or down is provided by onboard electricity from the generator 110. The generator 110 is implemented by placing a coil fixed with respect to one race 82, 86, and a magnet attached to the opposite race 86, 82. Practically, the magnet 114 is a wound electro-magnet or a permanent magnet. The windings 112 are passed through the magnetic field created by the magnet 114 to create electrical current in the winding 112. Thus, the generator 110 provides some amount of power to a local battery or the like in order to power various instrumentation, controls, and the like on the gyroglider 12.

In accordance with yet another embodiment, emergency power is provided for launch, landing in undesirable conditions, and the like. Accordingly, jets 116 are placed near the extreme outer ends of the blades 32. The jet 116 is activated by remote control from a ground station if necessary to spin up the rotor 22 of the gyroglider 12, temporarily fly a particular gyroglider 12 with its rotor 22 downward in a non-wind condition, and the like.

Referring to FIG. 13, while continuing to refer generally to FIGS. 1-21, one embodiment of the rotor 22 in accordance with the invention includes a pivot 64 secured to the blade 32 that is itself extending away from the hub 62 but not along a radius.

For example, in the embodiment of FIG. 13, the blades 32 themselves actually rely on the pivot 64 that extends perpendicularly across a radius 111 from the center of the hub 62. The blade 32 creates a bending stress as centrifugal forces attempt to "straighten" the blade 32 along the radius 111. The pivot 64 and the entire length of the blade 32 must resist such bending forces acting to align the blade 32 with a radius 111.

In this case, the leading edge 77 again operates at a shorter value of a radius 111 from the center of the hub 62 compared to the trailing edge 78. Accordingly, this configuration operates like that of FIGS. 11-12 in which the coning angle or the tendency of a blade 32 to lift up and operate in a conical configuration rather than flat planar configuration thus effects a change in the blade angle of attack 40 by virtue of such pivoting of the blades 32 about the pivots 64.

In this case, the stub 98 or anchor 98 to which each blade 32 is connected by the pivot 64, extends as a fixed element rigidly secured as part of the hub 62.

Referring to FIG. 14, as with the embodiments of FIGS. 5-13, the anchors 98 are fixed to the hub 62 and rotate therewith. Meanwhile, the pivot 64 pivotably secures each blade 32 to the anchor 98. A pin 118 extends through each anchor 98 to secure a trunnion 120 fixed to each blade 32. In the illustrated embodiment, the pins 118 extend along a direction perpendicular to a radius 111 through the center of rotation or axis or rotation 34 of the hub 62.

Likewise, the rotor 22 is formed to tilt about the mast 60, and is adapted to be secured to a mount 88, such as a spherical bushing or spherical ball connector. Accordingly, the rotor angle of attack 30 of the rotor 22 is controlled independently from the angle of attack 40 of the blades 32.

In an alternative embodiment, the pivots 64, and particularly the pins 118, extend at an angle with respect to the radius 111 from the center of the hub 62, thus providing a coupling between any coning or lifting of each blade 32, and the respective blade angle of attack 40 of that blade 32. Likewise, the pivots 64 extend perpendicularly with respect to a radius 111 of the hub 62, while the blades 32 extend at a canted angle, just as the blades of the apparatus of FIG. 13.

Referring to FIGS. 15A-15B, one embodiment of the gyroglider 12 includes a frame 52 secured to a tether 14. Meanwhile, servo-controlled pinions 68 operate along tracks 66 (a single track 66, multiple tracks 66, or the like) in order to pitch the frame 52 with respect to the tensioned tether 14 securing the gyroglider 12 with respect to a ground station or the ground generally. In one embodiment, bias elements 124 such as springs, extensible bands, and the like operate to lift the blades 32 to an attitude as illustrated in FIG. 15B.

With the pivots 64 as described with respect to FIGS. 11-14, the blade angle of attack 40 is negative when the blade 32 is in the comparatively higher position of FIG. 15B. Meanwhile, the cross-section 95 of the blade 32 of FIG. 15B is flying with a negative angle of attack 40 with respect to the configuration of FIG. 15A. Meanwhile, in the configuration of FIG. 15A, in response to centrifugal force, the blades 32 descend and operate in a plane about the axis of rotation 34 of the hub 62. In this case, the tether 14 is shown as passing through the hub 62. Practically, the tether 14 terminates at the frame 52, or at the hub 62, with a single gyroglider 12 on a tether 14.

Centrifugal force overcomes the bias of the bias elements 124, connected between the hub 62 and the blade 32 by bollards 126 or other attachment mechanisms. Centrifugal force overcomes the biasing force of the bias elements 124, thus causing the blades 32 to operate in substantially a planar configuration. In this configuration of FIG. 15A, the blade angle of attack 40 is at its most positive value.

In contrast, in the low speed configuration, when the blade is just starting up from a stationary or non-rotating position, that is when the gyroglider 12 speed is sufficiently slow, or the speed of rotation is sufficiently slow, then each of the blades 32 is lifted up by a bias element 124. This provides a situation wherein the wind 20 itself is not totally responsible to increase the coning angle or the coning of the rotor 22, but the bias elements 124 will do so automatically whenever the speed is insufficient to generate the centrifugal force required to flatten out the blades 32. Thus the biasing elements 124, being a resilient element are controlled by a centrifugal force and passively control the blade pitch.

In accordance with another embodiment of the present invention, the biasing elements 124, being servo actuators are adapted to actively control the blade pitch. The Angle of Attack (AoA) of the blades can be actively controlled such that either a windmill state for starting rotation (negative AoA) or a slightly positive AoA for autorotation is achieved.

Referring to FIGS. 16-17, in one embodiment, a structure 130 supports a turntable 132. The turntable 132 is supported on bearings reducing friction such that the rudder 54 of the gyroglider 12 generates sufficient rotational load to orient the gyroglider 12 into the wind 20.

Regardless of whether or not a turntable 132 is relied upon, the standoff 134 elevates a pivot 136 above the level of the turntable 132. On the pivot 136 the deck 140 is passively or actively controlled to change its attitude (angle) with respect to horizontal.

For example, in FIG. 16, the gyroglider 12 sits at rest on the deck 140 supported by legs or feet 138 extending from the frame 52. The legs 138 are a part of the frame 52 or may be extensible, permanent, retractable, and the like. Upon launching or landing, the deck 140 is tilted to provide the desired rotor angle of attack 30 to initiate or terminate flight. By the elevation of the structure 130, the aircraft rotor 22 is placed above the surface of the earth. Thus, the gyroglider 12 is launched by tilting the deck 140 to provide a greater rotor angle of attack 30 and thus launch the aircraft. A similar process occurs during landing.

For example, the tether 14 draws the gyroglider 12 downward, while the control systems discussed hereinabove fly the gyroglider 12 down by changing the rotor angle of attack 30, the blade angle of attack 40, or both. As the aircraft is flown down, a reduced force or tension in the tether 14 is experienced. The capstan 16 requires less energy output to retrieve the gyroglider 12 than the energy generated by the aircraft when it is lifting the gyroglider 12 against the tether 14, and producing maximum tension in the tether 14.

As the gyroglider 12 approaches the deck 140, the legs 138 touch the deck 140, and orient the deck to the gyroglider 12, or orient the gyroglider 12 to the orientation of the deck 140. Ultimately, the deck 140 is leveled for storage, maintenance, and the like.

FIG. 24 illustrates a landing/launching fixture 184 that allows the gyroglider apparatus in accordance with the present invention to take off or land on a single point either on the ground, on a tower, on top of a buoy at sea or on a ship. This landing/launching fixture 184 obviates the need for a runway to launch and land. Landing in zero wind on the fixture is possible by reeling in the tether 14 at a speed sufficient to sustain the lift of the rotating blades which is approximately 10 knots. Takeoffs can be done in winds as small as 10 knots as the lift of the gyroglider in accordance with the present invention is huge and at take off the weight of the tether is at a bare minimum.

The landing/launching fixture 184 is provided with a captive slot 186 that constrains the tether 14 and the two line bridle lines 170 as they pass through to the snatch block (pulley on a very short line) 188 located at the very center of a hollow turntable 200 with bearing rollers. In accordance with the present invention, the term 'bridle' is used to indicate lines or cables that serve the purpose of rigging for the tether. The two bridle lines 170 converge at a bridle knot to form the tether 14. The captive slot 186 is provided with two support arms 202. The snatch block 188 allows the gyroglider to fly in any quadrant of the sky without twists in the tether 14 or complicated rotating machinery. The location of the snatch block 188 is centered and just below the hollow turntable 200 and allows the tether 14 to be lead to a stationary capstan 16, converter 18 and tether storage means that do not need to move and can be permanently located below or in any direction or distance from the landing fixture 184.

In accordance with an embodiment of the present invention, multiple gygrogliders, each with a landing/launching fixture, share a common generating facility with the tethers running for some distance across the ground using a system of rollers or pulleys (in pipes for safety) to bring the tether tension to a common generating and line storage station.

Thus the landing/launching fixture as illustrated in FIG. 24 is adapted to cradle and hold the gyroglider without a need for heavy landing gear. The fixture pivots up and down to change the angle of attack of the rotor without the gyroglider leaving the safety of the cradle. This permits the gyroglider to power up and creates a large amount of lift before releasing and lifting off or conversely power down and stop the rotor when landing. The ability of the gyroglider to fly with roll control while captive in the captive slot 186 allows it to negotiate gusts and changes in wind direction from any and all quadrants, even 180 degree shifts. By virtue of the turntable 200, it is possible to track the gyroglider in the sky or while captive on the fixture 184 and ensure that the fixture 184 is always aligned with the changes in wind speed and wind direction, ready to accept the landing gyroglider at any moment. The tether is always threaded through the captive slot 186 and the tension ensures that the captive slot 186 and the fixture 184 are aligned with the wind.

FIG. 25 illustrates roll control for a gyroglider apparatus with two line bridles in accordance with an embodiment of the present invention. The attachment point where the two bridle lines 170 converge is shifted to the left or right dynamically in flight by means of at least one roll control means 178 which is either a toothed track, hydraulic ram, line or a smart metal mounted to an underside of the frame 52 with a servo roller 180. This causes the lift from the rotor 22 to be offset from the line and initiates a roll or turn to the left or right. If the attachment point is shifted to the left then the roll is to the left and vice versa. Thus by moving the attachment point either left or right of the Center of Pressure (CoP), the rotor 22 naturally tips and begins to tilt either left or right with very little control input force. The control box 172 pulls in and out lines 175 to activate pitch control.

Referring to FIG. 18, in one embodiment, rotors 22 are separated from their frames 52 at a ground station. The frames 52 at the ground station are represented by the numeral 148. For example, the capstan 16 actually retrieves the line, which is then stored in a tether storage means 142, which is a storage reel or a rope tank as illustrated in FIGS. 22A and 22B. A staging mechanism 144 provides for selective removal of each aircraft frame 52 from its associated rotor.

The rotors 22 are then stacked to pass the tether 14 through the center aperture 122 of the hub 62 thereof. Thus, the rotors 22 are stacked one against another or one very close to another and separated by padding and the like, rather than being separated by hundreds or thousands of feet of the tether 14 used in operation.

The gyroglider 12 is redeployed by flying the gyroglider 12 upward, fixing frames with respect to the tether, and flying each frame 52 with its own rotor 22 upward to the next distance of separation for another gyroglider 12 to be attached. Thus, multiple gyrogliders produce a net total lift to provide a net increase in tension in the tether 14.

Referring to FIG. 19, the frame 52 provides a capture mechanism such as a connector or adapter 150 adapting each frame 52 to connect to the hub 62 of a rotor 22. The adapter or connector 150 is connected along the path 152 to secure the frame 52 to the hub 62. Meanwhile, the frame 52 is selectively fixed with respect to the length of the tether 14, in order to operate the rotor at a location that will appropriately tension the tether 14. The particular embodiment illustrates two pinions 68 servo-controlled to operate along each of the tracks 66.

Practically, the gyroglider 12 operates as a platform for various instrumentation. For example, meteorological data is collected at comparatively high altitudes of tens of thousands of feet above the surface of the earth. Thus, comparatively reliable and long term data is obtained by adding instrumentation to the gyroglider 12.

Referring to FIG. 20, in one embodiment of an apparatus and method in accordance with the invention, a system 154 provides a method for controlling tension. Winds aloft are substantially more steady than winds near the nap of the earth. Accordingly, a controller 156 determines whether tension is within preset amounts permitted for a power stroke. Likewise, the controller 156 controls the tension by checking whether or not the tension is proper for a rewind stroke. The controller 156 receives an input 157 from an onboard tension meter 158. The tension meter 158 measures the tension being added or the tension existing in the tether 14. Meanwhile, an input 159 from a wind speed sensor 160 is provided to the controller 156 to indicate the wind speed to which a particular gyroglider 12 is exposed.

The wind speed sensor 160 provides an input 159 to the controller 156 indicating wind speeds. Accordingly, the controller 156 determines by an appropriate algorithm, whether or not the tension reported in the inputs 157 from the tension meter 158 is consistent with the configuration of the gyroglider 12, the rotor 22, the blades 32, in particular.

The controller 156 reports the state 162 of the tether 14. For example, if the state 162*a* suggests tension is within the proper range, then the controller 156 simply (as represented by the numeral 163*a*) repeats the monitoring cycle 164. If instead, the tension state reflects too low tension 162*b*, then the controller 156 acts to decrease the reeling speed at which the power is being generated. Thus, the controller 156 flies the gyroglider 12 in such way as to decrease 163*b* the ground station payout speed of the tether, in order to reduce the power in the power stoke. Likewise, if the tether 14 and gyroglider 12 are flying in on a rewind stroke, then the state 162*b* causes the controller 156 to increase the reel in speed of the capstan 16 thereby retrieving the tether 14.

If tension is outside the permissible operating range and at too low a value, the state 162*c* exists. The controller 156 increases 163*c* the rotor disk angle of attack 30 or alternatively, increase 163*c* the collective blade pitch 40. Thus, the blade angle of attack 40 or blade collective pitch 40 is increased in order to increase lift forces 46, and increase thereby the tension in the tether 14.

If the state 162*d* results in tension too high for the structures on the ground, in the aircraft, or the tether 14 itself, the controller 156 reduces 163*d* the rotor angle of attack AOA 30, or reduces 163*d* the collective blade pitch 40 or blade angle of attack 40.

Finally, if the state 162*e* exists and the tension in the tether 14 is severely exceeding the permissible range of tension permitted in the tether 14, the controller 156, flies the gyroglider 12 to increase 163*e* the payout speed of the capstan 16, or decrease 163*e* the rewind speed of the capstan 16 during the rewind stroke. Thus, the speed of reeling, the collective pitch 40 or both are controlled to reduce or otherwise control the tension. Ultimately, any of the states 162 are detected, and the remedial actions 163 are eventually fed back into the repeat of the cycle 164 sending in a new sensor output 166 or controller input setting 166 to the controller 156.

The commands or remedies 163 are set to operate in ranges. As an alternative embodiment, all of the commands or remedies 163 are implemented in continuous algorithms that operate various control parameters of the gyroglider 12 in order to operate within the specified range of tension in the tether 14.

Referring to FIGS. 21A-21D, an alternative embodiment of the gyroglider 12 includes a bridle 170, replacing certain portions of the rigid frame 52. For example, the frame portion simply includes the frame 52 illustrated in FIG. 21. Meanwhile, the bridle 170 replaces the tracks 66, 76 in the frames 52 described hereinabove.

A controller 172 draws a pitch arm 174 down, or releases it to travel up. The arm 174 is a pitch arm and the elevation of the pitch arm 174 provides an increase in pitch, of the gyroglider, while a decrease in the elevation of the pitch arm 174 decreases the pitch of the gyroglider 12. Thus, the rotor angle of attack 30 is modified by permitting the pitch arm 174 to elevate or to decline.

Lines 175 connected to the pitch arm, and to the aft portion of the frame 52 are run through the controller 172 to extend or contract the lines 175. Thus, the lines 175 can be considered as a single line passing through the controller 172, and distributed between the pitch arm 174 on the forward end of the gyroglider 12, and the aft portion of the frame, near the boom 58 in the aft portion of gyroglider 12.

Likewise, the right to left attitude of the roll arms 176 is controlled by drawing the roll lines 177 through the controller 172 in order to extend or shorten the distance from the controller 172 to the roll arm 176 on either side of the frame 52. Thus, in general, the bridle 170 provides roll and pitch control of the frame 52, and thus the roll and pitch angles of the rotor 22 associated therewith.

As the wind speed increases, the CoP (Center of Pressure) increases with the square of the wind while the CoG (Center of Gravity) remains constant. Soon the pendulum effect of the CoG (Center of Gravity) is overwhelmed by the much stronger effects of the CoP (Center of Pressure) and the gyroglider becomes unstable. The gyroglider apparatus in accordance with the present invention takes care of this through two embodiments as illustrated in FIG. 23. In one embodiment, a toothed track 178 is mounted to an underside of the frame 52 with a servo roller 180. A weighted box containing battery and other heavy flight equipment is mounted on a sliding track on the tail boom of the gyroglider apparatus. As the wind speed increases (or decreases) the weighted box slides along the track 178, thereby changing the center of gravity and keeping the pendulum effect in balance with the CoP. In case the tether breaks, the CoG is shifted on the track 178 to be in front of the CoP, thus making it possible to fly the gyroglider apparatus independently to the ground in an emergency situation. Alternatively, a horizontal stabilizer 182 is provided at the rear to provide a counter downward force that increases with the speed of the wind at the same rate as the increase in the CoP as the wind increases. The natural pendulum effect is lost but is artificially controlled with an auto pilot manipulating the Rotor Angle of Attack (AoA) and/or Blade Angle of Attack (AoA) and/or horizontal and vertical tail surfaces.

FIG. 26 illustrates the gyroglider apparatus in accordance with the present invention being provided with a flywheel 206 and clutches 204 to even out the power generated by eliminating peaking and spikes. The clutches 204 and the flywheel 206 regulate the RPM and torque at the input to the converter 18. The clutches 204 are mechanical or infinitely adjustable electromagnetic clutches. Motor used in the rewind stroke is represented by the numeral 208. The tether 14 is connected to a landing fixture which is close by if a single gyroglider is connected or it is a few kilometers away if multiple gyrogliders are connected for powering one converter 18. The flywheel 206 stores momentum from the power strokes of the gyroglider apparatus for extraction to the converter 18 during retrieval of the tether 14. The converter 18, typically a generator, receives a steady RPM and torque from the flywheel 206 that is regulated by the clutches 204. In accordance with one aspect of the embodiment, the RMP is stepped up or down with gear arrangements. In accordance with another aspect of this embodiment, more than one capstan 16 and retrieval motor 208 are attached to a single flywheel 206 and converter 18.

The Bernoulli Effect operates in liquids. However, it is not typically relied on to create lift. The reason is that liquid if passing by in a free stream, in order to constrict to a reduced area, must be drawn away from other liquid. Meanwhile, the Bernoulli Effect in liquids is often seen with constriction of flow paths where the adjacent material is a solid wall in a conduit conducting liquid, rather than a particular flow of liquid in a free stream, where all movement of liquid must be associated with displacement of adjacent liquid.

In alternative embodiments, an apparatus and method in accordance with the invention works in water. The Bernoulli lifting effect is typically relied on for flight in gases. Nevertheless, other fluids, such as liquids, may also be used otherwise to advantage. For example, certain flows due to tides, rivers, and the Gulf stream within the ocean propagate motion of large volumes and masses of fluid. In such an embodiment, the apparatus 10 may, but need not, operate as a windmill. Such a device is anchored to rotate about a horizontal axis parallel to the fluid flow, thus operating as a "water mill."

In certain waterborne embodiments, as well as airborne embodiments, a barge anchors at a point in a body or stream of water. The generator system with its take-up unit is installed on such a barge or on land at the surface of the body of water.

In one alternative embodiment, a rotor or sail is tethered from a pulley secured to the floor of a body of water. Drag factors are designed to differ between blades moving with and against the fluid flow. Thus, the flow of a current tends to rotate the blades causing the blades to auger upward through the water drawing the line of the tether upward or can auger down from a barge or a ship in an alternate embodiment.

Similarly, generated energy is conducted in any suitable manner. In one embodiment, electrical energy generation is a suitable transformation of the energy of a rotor into a suitably distributable and storable medium. Alternatively, hydraulic power, compression of a gas such as air or another working fluid, pumping water, and the like is a result of conversion of the energy generated by the rotor in drawing the tether.

In certain embodiments, energy is generated in a mechanical form rather than electrical form and used directly. For example, compressed gases, a flow of water, and the like are used to propel various transportation modes.

Similarly, in certain embodiments the tether 14 is connected directly to tow or to generate power on water craft, such as boats or ocean going ships. Rather than a sail providing power, a rotor provides electrical power or mechanical power to drive the screws of a ship. Even with lower power generation capacities, an apparatus 10 in accordance with the invention provides power to operate electrical and control equipment on board a ship, even while the ship continues to move across the ocean.

In certain embodiments, an apparatus 10 in accordance with the invention serves as a tower aloft carrying communication devices, telephone cell repeaters, radar systems, weather sensors, atmospheric sensors, fire detection devices, ground sensors, and the like. The altitude, stability, and available power from an apparatus 10 in accordance with the invention provide an excellent platform with supporting power to such devices.

In certain embodiments, the blade angle of attack 40 is controlled by a "smart metal" having a memory. Accordingly, upon temperature change, the metal deflects, causing a change in pitch of the blade to which the smart metal serves as a mounting. Meanwhile, other actuators, including those enclosed in the Groen patent reference incorporated herein by reference above, and other apparatus known in the art, may be used to control on demand the blade angle of attack 40 of the rotor.

The gyroglider apparatus in accordance with the present invention effectively utilizes shunting during cross wind maneuvering for power generation. Maintaining a constant rotor pitch and varying the bank angle defined by the angle between the gyroglider's normal axis and the Earth's vertical plane containing the gyroglider's longitudinal axis, cross wind maneuvering of said gyroglider is achieved such that a cross range velocity is induced. Depending upon the lift/drag ratio of the rotor, a relative wind on the rotor in far excess of ambient wind is further introduced, resulting in shunting of the gyroglider. FIGS. 27A-27E illustrate graphical representations of flight parameters during cross wind maneuvering. It is evident from the graphical representation that under identical ambient wind conditions, using a cross wind maneuver more than double the relative wind (4×dynamic pressure) is achieved as compared to that under straight ahead maneuver. As illustrated in FIG. 27B, the bank angle is modulated early in the power stroke so as to limit line tension during the period of high relative ambient wind prior to winch deploy rate becoming fully developed (which serves to reduce relative wind); this is done to keep the line tension within a safety factor of 2.0 based on the design criteria. The nominal profiles of the flight parameters during cross wind maneuvering are illustrated in FIGS. 27B and 27C. The trajectories of the gyroglider in accordance with the present invention during cross wind maneuvering are illustrated in FIGS. 27D and 27E. The difference in cross range at the closure of the cycle, results from the asymmetry in the bank angle profile, and would be "washed out" on successive trajectories by reversing the profile asymmetry. The shunting flight trajectory followed by the gyroglider in accordance with the present invention during cross wind maneuvering helps generate about 30% more power.

The numerical values given of various physical parameters, dimensions and quantities are only approximate values and it is envisaged that the values higher or lower than the numerical value assigned to the physical parameters, dimensions and quantities fall within the scope of the invention unless there is a statement in the specification to the contrary.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A gyroglider apparatus for power generation comprising:
at least one gyroglider comprising a rotor with a plurality of rotor blades rotatably secured to a frame, said rotor adapted to rotate about an axis of rotation and provide a lift to said gyroglider; said rotor having a rotor pitch defined by a path of said rotor with respect to the incoming wind and a blade pitch defined respectively for each of said rotor blades by the angle of said blade with respect to the incoming wind, wherein a means is provided to vary bank angle of said rotor, said bank angle defined by the angle between said gyroglider's normal axis and the Earth's vertical plane containing said gyroglider's longitudinal axis;
a tether having a first end and a second end, said first end being positioned proximate the earth and the second end extending aloft, said tether being adapted to secure said gyroglider at said second end thereof;
tension management means adapted to manage tension in said tether comprising:
an onboard tension meter adapted to measure tension existing in or added to said tether;
a wind speed sensor adapted to indicate the wind speed to which said gyroglider is exposed; and
a controller adapted to receive inputs from said onboard tension meter and said wind speed sensor and cyclically monitor the tension in said tether, said controller being further adapted to determine whether the input from said onboard tension meter is consistent with the configuration of said gyroglider, said rotor and said blades; and generate an output state of said tether;
a first control means adapted to receive said output state of said tether and selectively control said rotor pitch if said output state indicates a value too low or too high with reference to a predetermined range;
a second control means adapted to receive said output state of said tether and selectively control said blade pitch if said output state indicates a value too low or too high with reference to said predetermined range;
a capstan adapted to receive said output state of said tether and further adapted to cyclically reel in or payout said tether proximate said first end thereof, in a predetermined systematic order if said output state indicates a value way too low or way too high with reference to said predetermined range;
a converter adapted to convert rotational energy from said capstan to power in a form selected from the group consisting of transmissible forms, storage forms and both, a transmissible form and a storage form; and
a connector adapted to connect said capstan to said converter.

2. The gyroglider apparatus as claimed in claim 1, wherein said gyroglider apparatus further comprises means to manage shunting of said gyroglider, said means being adapted to maneuver said gyroglider cross wind such that a cross range velocity is induced and further adapted to induce a relative wind on said rotor in excess of ambient wind resulting in tension in said tether.

* * * * *